(12) United States Patent
Johnson et al.

(10) Patent No.: US 7,805,330 B2
(45) Date of Patent: Sep. 28, 2010

(54) SYSTEM AND METHOD FOR CROSS-SELLING PRODUCTS AND SERVICES ACROSS AN ENTERPRISE

(75) Inventors: Thomas H. Johnson, Bozeman, MT (US); Warren White Bauder, Bozeman, MT (US); Gretchen Andes Bauder, Bozeman, MT (US); LeRoy Ira Verwolf, Belgrade, MT (US); Mark Steven Douma, Bozeman, MT (US); Robert M. Calhoun, Jr., Bozeman, MT (US); Scott Michael Bridges, Bozeman, MT (US); William James Porter, Gallatin Gateway, MT (US); Nanette Marianne DeVault, Bozeman, MT (US); Ryan Joseph DeGraw, Bozeman, MT (US); Timothy H. Stevens, Bozeman, MT (US); Bradley Louis Benjamin, Bozeman, MT (US)

(73) Assignee: Zoot Enterprises, Inc., Bozeman, MT (US)

( * ) Notice: Subject to any disclaimer, the term of this patent is extended or adjusted under 35 U.S.C. 154(b) by 473 days.

(21) Appl. No.: 11/856,998

(22) Filed: Sep. 18, 2007

(65) Prior Publication Data
US 2009/0076884 A1   Mar. 19, 2009

(51) Int. Cl.
*G06Q 30/00* (2006.01)
*G06Q 40/00* (2006.01)
*G06F 9/44* (2006.01)
*G06F 17/30* (2006.01)

(52) U.S. Cl. .............................. 705/10; 705/7; 705/14; 705/14.26; 705/28; 705/35; 705/36 R; 705/37; 705/38; 706/12; 706/47

(58) Field of Classification Search .................. 705/7, 705/10, 14, 14.26, 26, 28, 35, 36, 36 R, 37, 705/38, 47; 706/12, 47
See application file for complete search history.

(56) References Cited

U.S. PATENT DOCUMENTS 5,930,764 A   7/1999   Melchione et al.

(Continued)

OTHER PUBLICATIONS

Anonymous, Sasfin Bank: Bank improves risk analysis and efficiency with an intelligent single view of customer, Microsoft® Case Studies: Sasfin Bank (Search Microsoft.com), Feb. 27, 2007.*

(Continued)

*Primary Examiner*—Kirsten S Apple
*Assistant Examiner*—B. Joan Amelunxen
(74) *Attorney, Agent, or Firm*—Antoinette M. Tease

(57) ABSTRACT

A system for cross-selling products and/or services across an enterprise comprising an enterprise-level decision engine and a plurality of line-of-business decision engines; wherein characteristics derived by the enterprise-level decision engine are used by the line-of business-level decision engines to generate cross-sell offer decisions; enterprise-level business rules and line-of-business-level business rules are managed independently of one another; a publish-subscribe message framework allows data to be published at an enterprise level and subscribed to by the line-of-business decision engines according to business rules established at the line-of-business level; the line-of-business decision engines generate cross-sell offer decisions; and the enterprise-level decision engine stores data to and retrieves data from an operational and an analytics data repository. A method of using the system described above to generate cross-sell offer decisions.

4 Claims, 13 Drawing Sheets

U.S. PATENT DOCUMENTS

| | | | |
|---|---|---|---|
| 5,966,695 A | | 10/1999 | Melchione et al. |
| 5,970,476 A | * | 10/1999 | Fahey .......................... 705/28 |
| 6,088,686 A | | 7/2000 | Walker et al. |
| 6,272,478 B1 | * | 8/2001 | Obata et al. .................... 706/12 |
| 6,321,206 B1 | * | 11/2001 | Honarvar ....................... 705/7 |
| 6,324,523 B1 | * | 11/2001 | Killeen et al. ............. 705/36 R |
| 6,405,173 B1 | * | 6/2002 | Honarvar et al. ............... 705/7 |
| 6,901,373 B1 | * | 5/2005 | Chasko .................... 705/14.26 |
| 6,965,865 B2 | | 11/2005 | Pletz et al. |
| 7,076,475 B2 | * | 7/2006 | Honarvar ..................... 706/47 |
| 2001/0047307 A1 | | 11/2001 | Bennett et al. |
| 2002/0116237 A1 | * | 8/2002 | Cohen et al. ................... 705/7 |
| 2002/0174059 A1 | * | 11/2002 | Guo .............................. 705/37 |
| 2002/0194094 A1 | | 12/2002 | Lancaster et al. |
| 2002/0194117 A1 | | 12/2002 | Nabe et al. |
| 2002/0194120 A1 | | 12/2002 | Russell et al. |
| 2003/0074342 A1 | | 4/2003 | Curtis |
| 2003/0088491 A1 | * | 5/2003 | Liu et al. ...................... 705/36 |
| 2004/0064371 A1 | * | 4/2004 | Crapo ......................... 705/14 |
| 2007/0050201 A1 | | 3/2007 | Gardner et al. |
| 2007/0067206 A1 | | 3/2007 | Haggerty et al. |
| 2007/0067207 A1 | | 3/2007 | Haggerty et al. |
| 2007/0067208 A1 | | 3/2007 | Haggerty et al. |
| 2007/0067209 A1 | | 3/2007 | Haggerty et al. |
| 2007/0078741 A1 | | 4/2007 | Haggerty et al. |
| 2007/0083418 A1 | | 4/2007 | Quiring et al. |
| 2007/0233586 A1 | * | 10/2007 | Liu et al. ...................... 705/35 |

OTHER PUBLICATIONS

Anonymous, Microsoft Case Studies: Sasfin Bank—Bank Improves Risk Analysis and Efficiency with an Intelligent Single View , Feb. 27, 2007.*

Anonymous, Cross-selling kicks off upfront: ABC remains the only net with a stad-alone cross-platform unit doing pre-marketplace deals, Media Week, v 17, n 7, p. 4. Feb. 12, 2007.*

Barton Crockett, Column name: Investment Products: Winsbury, Bank Fund Division of Bisys, Is Given a New Name Series: 10. American Banker, vol. 159, issue 211, p. 14. Nov. 1, 1994.*

* cited by examiner

◆ PROCESS EDITOR ▲ TREE EDITOR ☰ TABLE EDITOR ◆ RULE EDITOR

CROSS-SELL INCLUSION TABLE
☑ AI ENABLED  ☑ EXECUTE ALL ROWS  ☐ TURN AUTO FORMAT OFF
DESCRIPTION: ╱1

| ATTRIBUTE | CHANNEL CD | POC EVENT CD | POC PROD CD | CON POC ACCT | LOB CODE | PRODUCT CD | CSC INCL REAS.. |
|---|---|---|---|---|---|---|---|
| | REQ CHANNEL | POC EVENT CD | POC PROD CD | CON TYPE | LOB CODE | PRODUCT CD | CROSS-SELL IN.. |
| RESULT | RESULT ☐ | RESULT ☐ | RESULT ☐ | RESULT ☐ | RESULT ▼ | RESULT ▼ | RESULT ▼ |
| LOGIC | = | = | ▼ | = | ▼ APPEND | ▼ APPEND | ▼ APPEND |
| COLUMN | | | ▼ | ▼ | | | |
| 1 | 01 - RETAIL | 01 - NEW ACCT | 01 - DDA | OWNER | XXHL | HELOC | CSC001 |
| 2 | 01 - RETAIL | 01 - NEW ACCT | 01 - DDA | OWNER | XXCC | CARD | CSC002 |
| 3 | 01 - RETAIL | 01 - NEW ACCT | 01 - DDA | OWNER | XXVE | AUTO | CSC003 |
| 4 | 01 - RETAIL | 01 - NEW ACCT | 01 - DDA | GUARDIAN | XXSB | BLOC | CSC004 |
| 5 | 01 - RETAIL | 01 - NEW ACCT | 03 - SBDDA | BUSINESS | XXCC | CARD | CSC005 |
| 6 | 01 - RETAIL | 01 - NEW ACCT | 03 - SBDDA | NON_OWNER | XXSB | BLOC | CSC006 |
| 7 | 01 - RETAIL | 01 - NEW ACCT | 03 - SBDDA | OWNER | XXCC | CARD | CSC007 |
| 8 | 01 - RETAIL | 02 - ACCT MAINT | 02 - CDA | INDIVIDUAL | XXCC | CARD | CSC008 |
| 9 | 01 - RETAIL | 03 - FINANCIAL | 03 - SBDDA | INDIVIDUAL | XXCC | CARD | CSC009 |
| 10 | | | | | | | CSC010 |

RELEASE COMMENT

TABLE TOOLS
[ADD ROW] [INSERT ROW] [DELETE ROW] [ADD COLUMN] [INSERT COLUMN] [DELETE COLUMN]

FIGURE 4

◆ PROCESS EDITOR | ▲TREE EDITOR | ▤TABLE EDITOR | ◆RULE EDITOR

PRODUCT CONTROL TABLE
☑ AI ENABLED   ☐ EXECUTE ALL ROWS   ☐ TURN AUTO FORMAT OFF
DESCRIPTION:

| ATTRIBUTE | LOB CODE | PRODUCT CODE | BUREAU | CONSUMER SENT TO LOB | LOB DE SEQ | CREATE CSC FOR 2.. | CONSUMER TO PULL | REUSE CONSUMER | EXISTING OFFER PRO.. |
|---|---|---|---|---|---|---|---|---|---|
|  | ↘13 | ↘14 | ↘15 | ↘16 | ↘17 | ↘18 | ↘19 | ↘20 | ↘21 |
|  | LOB CODE | PRODUCT CODE | BUREAU | CONSUMER SENT TO LOB | LOB DE SEQ | CREATE CSC FOR 2.. | CONSUMER TO PULL | REUSE CONSUMER | EXISTING OFFER PRO.. |
| RESULT | ☐ RESULT ▼ | ☐ RESULT ▼ | ☐ RESULT ▼ | ☐ RESULT ▼ | ☐ RESULT ▼ | ☐ RESULT ▼ | ☐ RESULT ▼ | ☐ RESULT ▼ | ☐ RESULT ▼ |
| LOGIC | = ▶ | = ▶ | ▶ | ▶ | ▶ | ▶ | ▶ | ▶ | ▶ |
| COLUMN |  |  |  |  |  |  |  |  |  |
| 1 | XXHL | HELOC | EQ, TU | ANY | 0 | N | PRIMARY |  |  |
| 2 | XXCC | CARD | 32 | MAIN | 0 | N | PRIMARY |  |  |
| 3 | XXVE | AUTO | TU, EQ, EX | MAIN | 0 | Y | INDIV |  |  |
| 4 | XXVE | BOAT | TU, EQ, EX | PRIMARY | 0 | Y | INDIV |  |  |
| 5 | XXVE | RV | TU, EQ, EX | ANY | 1 | N | INDIV |  |  |
| 6 | XXSB | BLOC | EX CONS | OWNER / BUS | 2 | N | INDIV |  |  |
| 7 | XXSB | BODLOC | EX CONS | OWNER ONLY |  | N | INDIV |  |  |

RELEASE COMMENT

TABLE TOOLS

| ADD ROW | INSERT ROW | DELETE ROW | ADD COLUMN | INSERT COLUMN | DELETE COLUMN |

FIGURE 6

| ◆PROCESS EDITOR | ▲TREE EDITOR | ▤TABLE EDITOR | ◆RULE EDITOR |
|---|---|---|---|

PRODUCT CONSUMER ARBITRATION TABLE
☑ AI ENABLED   ☐ EXECUTE ALL ROWS   ☐ TURN AUTO FORMAT OFF

DESCRIPTION:

| ATTRIBUTE | LOB CODE | PRODUCT CODE | SUB-PROD CODE | VALUED CUST | LOW STATED INCOME | HIGH STATED INCOME | HOME LOAN WITH US | PRODUCT CONS SCORE | SCORE REASON |
|---|---|---|---|---|---|---|---|---|---|
|  | LOB CODE | PRODUCT CODE | SUB-PROD CODE | VALUED CUST | LOW STATED INCOME | HIGH STATED INCOME | HOME LOAN WITH US | PRODUCT CONS SCORE | SCORE REASON |
| RESULT ☐ | RESULT ☐ | RESULT ☐ | RESULT ☐ | RESULT ☐ | RESULT ☐ | RESULT ☐ | RESULT ☐ | RESULT ☑ | RESULT ☑ |
| LOGIC | = | = | = | = | > | >= | = |  |  |
| COLUMN | ▶ | ▶ | ▶ | ▶ | ▶ | ▶ | ▶ | ▶ | ▶ |
| 1 | XXHL | HELOC |  |  |  |  |  |  | PS0001 |
| 2 | XXHL | HELOC |  | H |  | 45000 | Y | 10 | PS0002 |
| 3 | XXHL | HELOC |  | M | 45000 | 65000 | N | 40 | PS0003 |
| 4 | XXCC | CARD | 100-PLAT | L | 65000 | 45000 | Y | 50 | PS0004 |
| 5 | XXCC | CARD | 100-PLAT | H | 45000 | 65000 | N | 5 | PS0005 |
| 6 | XXCC | CARD | 100-PLAT | M | 65000 |  | Y | 10 | PS0006 |
| 7 | XXCC | CARD | 010-GOLD | L |  | 45000 | N | 30 | PS0007 |
| 8 | XXCC | CARD | 010-GOLD | H | 45000 | 65000 | Y | 5 | PS0008 |
| 9 | XXS3 | BLOC |  | M | 65000 |  | Y | 10 | PS0009 |
|  |  |  |  | L |  |  |  | 10 |  |

RELEASE COMMENT

TABLE TOOLS

| ADD ROW | INSERT ROW | DELETE ROW | ADD COLUMN | INSERT COLUMN | DELETE COLUMN |
|---|---|---|---|---|---|

FIGURE 11

| PRODUCT ARBITRATION TABLE | | | | | | | |
|---|---|---|---|---|---|---|---|
| ☑ AI ENABLED ☐ EXECUTE ALL ROWS ☐ TURN AUTO FORMAT OFF | | | | | | | |
| DESCRIPTION: | | | | | | | |
| ATTRIBUTE | LOB CODE↙35 | PRODUCT CODE↙36 | SUB-PROD CODE↙37 | LOW OFFER AMOUNT↙38 | HIGH OFFER AMOUNT↙39 | PRODUCT SCORE↙40 | PROD SCORE REASON↙41 |
| | LOB CODE | PRODUCT CODE | SUB-PROD CODE | LOW OFFER AMOUNT | HIGH OFFER AMOUNT | PRODUCT SCORE | PROD SCORE REASON |
| RESULT | RESULT ☐ | RESULT ☐ | RESULT ☐ | RESULT ☐ | RESULT ☐ | RESULT ☐ | RESULT ☑ |
| LOGIC | = | = | = | = | > | >= | |
| COLUMN | | | | | | | |
| 1 | XXHL | HELOC | | | 50000 | 10 | PS0001 |
| 2 | XXHL | HELOC | | 50000 | 25000 | 40 | PS0002 |
| 3 | XXHL | HELOC | | 250000 | | 50 | PS0003 |
| 4 | XXCC | CARD | 100-PLAT | | 10000 | 5 | PS0004 |
| 5 | XXCC | CARD | 100-PLAT | 10000 | 200000 | 10 | PS0005 |
| 6 | XXCC | CARD | 100-PLAT | 200000 | | 30 | PS0006 |
| 7 | XXCC | CARD | 010-GOLD | | 10000 | 5 | PS0007 |
| 8 | XXCC | CARD | 010-GOLD | 10000 | | 10 | PS0008 |
| 9 | XXSE | BLOC | | | | 10 | PS0009 |

RELEASE COMMENT

TABLE TOOLS

| ADD ROW | INSERT ROW | DELETE ROW | ADD COLUMN | INSERT COLUMN | DELETE COLUMN |

FIGURE 12

```
<Request xmlns:xsi="http://www.w3.org/2001/XMLSchema-instance">
    <Request_Header>
        <Request_Header_Info
            Service_Version_ID="01_00_00"
            Requestor_Organization_Code="ACME"
            Source_Case_ID="TestCaseJC0002"
            Source_Case_Sequence_Number="1"
            Test_Case_Flag="F"
            CustID="zcsd"
            Live_Prescreen_Allowed_Flag="T"
            Offer_Lookup_Allowed_Flag="T"
            Cross_Sell_Candidates_Requested_Flag="T"
            Immediate_Ack_Requested_Flag="T"
            Request_Date_Time_Local="2007-08-11T09:30:47"
            Request_Date_Time_GMT="2007-08-11T09:30:47-05:00"/>
        <Requestor_Info>
            <Requestor_Data
                Requestor_Channel_Code="01"
                Requestor_Location_ID="0001279"
                Requestor_Region_ID="NW"
                Requestor_User_ID="t123987"
                Requestor_User_Role_Code="CSR"
                Requestor_POC_System_ID="optima"
                Requestor_POC_Event_Code="01"
                Requestor_Line_of_Business_Code="RetailBank"
                Requestor_Workstation_ID="4r57w9er8f7s34r"/>
            <Requestor_Characteristic
                Characteristic_Name="Requestor Work Phone"
                Characteristic_Value="406-555-1212"/>
            <Requestor_Characteristic
                Characteristic_Name="Requestor Mailstop"
                Characteristic_Value="ACMETower101"/>
        </Requestor_Info>
    <Request_Info>
        <POC_Account_Info>
            <POC_Account_Data
                POC_Account_Product_Code="01"
                POC_Account_Sub_Product_Code="B1"
                POC_Account_Type="ASSET"
```

FIGURE 13

SYSTEM AND METHOD FOR CROSS-SELLING PRODUCTS AND SERVICES ACROSS AN ENTERPRISE

BACKGROUND OF THE INVENTION

1. Field of the Invention

The present invention relates generally to the field of computer-implemented inventions, and more specifically, to a system and method for cross-selling products and services across an enterprise.

2. Description of the Related Art

Virtually every company in the world involved in selling products or services to its consumer base is interested in strengthening its relationship with those consumers. The ability to increase the number and type of products and/or services sold to each consumer, while ensuring that the sale of those products and services benefits both the consumer and the company, is key to these relationships. Cross-selling products and services to customers, however, poses certain technological challenges.

By way of example, companies in the financial services industry are customarily organized into separate business silos or lines of business (LOBs), each of which is responsible for its own performance and contribution to the profitability of the enterprise as a whole. These separate LOBs often view their current and prospective consumers as prospects only for their own particular product lines because the idea of cross-selling products from another LOB is perceived as a threat to—or at least competitive with—the sale of their own products. Given limited opportunities in which to capture a consumer's interest, each LOB assumes that any opportunity must be used to sell its products, even if selling a different product would benefit both the consumer and the enterprise more. With this individualized focus, cooperative cross-sell strategies are time-consuming, expensive and difficult to implement, resulting in missed enterprise-level opportunities to sell products and services from multiple LOBs. The complex tasks of analyzing and fine-tuning cross-sell strategies for high sales volume while accurately tracking and managing risk exposure is further complicated by the lack of integration between LOBs.

Because each LOB is responsible for its specific goals, each LOB must have decision-making autonomy. Unfortunately, the technology solutions currently available to assist with automated decision-making at the LOB level discourage or prevent centralized control in areas where such control is beneficial to the enterprise. With each LOB implementing its own controls to ensure compliance with regulatory requirements such as the Fair Credit Reporting Act (FCRA), the Fair and Accurate Credit Transactions Act (FACT), and the Gramm-Leach-Bliley Act (GLBA), enterprise-level investment in these controls is unnecessarily high, and the risk of inconsistent and erroneous implementation of such controls is greatly increased.

Given the heavy merger and acquisition activity in the financial services sector, many companies have experienced a proliferation in automated point of contact (POC) systems, each with its own technology platform and most of which do not communicate with one another. As one institution merges with or acquires another, the automated POC systems of each institution are often left in place, making it extremely difficult to implement a technology platform that integrates those functions and is deployed in a more centralized fashion. The various LOBs generate sales leads, manage consumer information, and process applications in one or more of their own separate systems, perpetuating the problem related to offering their current and prospective consumers a consistent experience.

With multiple systems responsible for various pieces of the institution's view of its consumer, it is extremely difficult to get a complete picture from any one system. For example, a branch teller using a financial transaction POC system to help a consumer deposit his paycheck into his checking account may have no idea that the consumer has an available Home Equity Line of Credit (HELOC) offer that was generated when a branch customer service representative helped the consumer open his checking account earlier in the month on a different POC system. Even if the consumer's initial reaction to the offer was positive, the opportunity for the teller to reinforce the offer and close the sale is lost, simply because system A did not know what had taken place in system B. It is no wonder the consumer often comes away with the impression that the financial institution does not value or even recognize her needs.

The separate technology platforms used by multiple POC systems has resulted in each LOB being responsible for acquiring its own credit bureau and other external data used in determining risk and other aspects of its consumers' pertinent spending behavior and needs. This situation has led to redundant and unnecessarily expensive integration with the various data providers and has hindered or prevented sharing of such data between LOBs.

Improvements in technology have enabled consumer contact through a growing number of distribution channels. Consumers can conduct their business and shop for products and services via traditional brick and mortar branches, home loan offices, telephone call centers, loan and insurance brokerage offices, automated teller machines (ATMs), and Internet sites, to name a few. With little or no integration between these various contact points, the consumer is presented with an inconsistent and often confusing experience. In most cases, no attempt is made to understand the consumer's needs beyond the immediate purpose of the current contact, and a significant opportunity to strengthen the consumer relationship is lost.

In today's marketplace, financial institutions are extremely dynamic in their business practices. In addition to expansion through mergers and acquisitions, they constantly add and remove product lines to meet the needs of their consumers. It is not uncommon for new product lines to be accompanied by new technology platforms intended to reach the consumer either through an existing or a new distribution channel. These new technology platforms add to the integration challenge, and while they may address a new consumer need, they make understanding the complete picture of the consumer all the more difficult. With data about their existing consumers spread among multiple systems, financial institutions lack the ability to use all of that data in a comprehensive fashion.

The notion of the uncaring, remote, mega financial service provider has led to a recent revival in growth of the small, high-touch financial service company. Smaller companies are often on a first name basis with their consumers but are unable to manage and analyze their risk and cross-sell strategies simply because they cannot accumulate the data needed to do so.

Traditional direct mail campaigns have targeted millions of households with solicitations to apply for various products and services, most notably in the credit card arena. Credit card offers, for example, arrive by mail on such a frequent basis that most consumers simply throw away the offer without ever looking at it. These campaigns are costly in terms of compiling the solicitation lists, mailing the solicitation and processing the responses. Historically, although expensive and time-consuming to implement, these campaigns have less than a one percent success rate where the targeted consumer actually accepts the solicitation.

In contrast with mass direct mail campaigns, acceptance rates for offers presented at the time the consumer has initiated contact with a financial institution have proven to be far higher, often by an order of magnitude. When a consumer initiates contact with a financial institution, she is often more receptive to offers that pertain to her specific needs. For example, being able to identify additional products the consumer may need at the time she is opening up a new checking account represents a far better opportunity to make the sale than if an offer for additional products was delivered in the mail. When identifying these potential offers involves analyzing the consumer's credit report data, the process is commonly referred to as "instant prescreen" processing.

The ability to perform live instant prescreen processing for additional products is not something a financial institution can perform on its own behalf due to regulations defined in the FCRA. These regulations prohibit lenders from having direct access to a consumer's credit report file unless the consumer has explicitly requested a credit product and given her permission (explicit or implicit) for the lender to obtain her credit report data. Instead, the institutions have been forced to use one or more of the credit reporting agencies to perform the credit data analysis on a large population of consumers and then resort to costly mail campaigns with limited effectiveness. In addition to regulatory concerns, the technical challenges of integrating one, let alone multiple, POC systems with the each of the various credit bureaus and other data providers needed to enable instant prescreen processing are daunting.

While large institutions are able to offer more robust product lines and leverage economies of scale to compete on price and features, they lack the ability to provide outstanding consumer service because of their inability to capture integrated, comprehensive views of their consumers' needs and current situations. The smaller company can offer outstanding consumer service, but it cannot compete with larger institutions in terms of product features and price because of the traditionally high cost of acquiring new and retaining existing consumers. Furthermore, the available consumer base is rapidly becoming saturated with redundant products and services offered by many of the providers seeking consumers' business. The ability to differentiate offers on price and feature, with the focus on efficiently meeting specific consumer needs, is an objective widely sought by small financial institutions.

As competition increases for consumer loyalty and the right to provide the products and services the consumer is interested in owning, the consumer's ability to shop for products and services and take her business elsewhere has also increased. The key to existing consumer retention and new consumer acquisition is the ability to analyze the effectiveness of cross-sell and credit risk strategies and to quickly and safely implement changes to those strategies. With the proliferation of POC systems and distribution channels, along with individualized LOB focus, financial institutions do not have a consolidated source of data to perform such analysis. They are forced to cobble together information from multiple sources and in varying technical formats, limiting their ability to quickly analyze data and respond to their consumers' needs.

The ability to handle increased consumer interest generated by a highly successful marketing campaign is another challenge facing financial institutions. Often referred to as scalability, the goal is to provide cost-effective means of handling normal, everyday activity while being able to process spikes in activity. For example, consider the impact of a Super Bowl advertisement for a new home equity loan product. The last thing a lender wants is to be forced to turn consumers away because its automated solutions are not up to the task of handling a sharp increase in activity.

With the advent of the Internet and other new technologies, consumers are able to get instant answers to questions, purchase products and services, research and compare products all in far less time than ever before. This age of instant gratification affects the way financial institutions must respond to their consumers' needs. Traditional loan application processes involving a paper application being submitted and followed by a several-day period where the lender evaluates the application and makes a decision of whether or not to grant credit to the consumer are no longer sufficient. Consumers expect and demand a much faster turnaround process, and lenders who can respond with an instant, real-time decision are far more likely to retain existing and acquire new consumers.

There is no automated solution on the market today that addresses all of these issues. A successful solution must ensure enterprise-level consistency, compliance and control while enabling LOB-level autonomy for managing cross-sell strategies, credit decisioning and risk-based pricing. A successful solution must also provide easily deployed integration options for dealing with multiple POC systems with consumer contact being made via any available channel. Access to all available product line offers no matter what POC system or distribution channel is being utilized by the consumer, together with the ability to perform instant prescreen processing and traditional consumer-initiated credit decisioning with access to any credit bureau or other external data source are all important aspects required of any complete solution.

In addition, the solution must be provided in an environment that ensures high availability and scalability along with strict security and regulatory compliance. In the current marketplace, consumers are able to conduct their financial business and obtain new products and services 24 hours a day, 7 days a week, and they demand 100% protection of their personal and financial data while doing it. Financial institutions that experience even a minor breach in security that allows consumer information to fail into the hands of someone intending to commit fraud are subject to significant punitive penalties and potentially unrecoverable damage to their reputation in the marketplace.

These same institutions are saddled with multiple delivery channels and POC systems and have traditionally been forced to invest large amounts of capital, energy, and human resources in meeting these needs. An integrated solution, with security and compliance controls implemented in one place, as opposed to separately for each LOB and POC system, is what is needed. If an integrated solution can be accessed in an application service provider (ASP) environment, the financial institution stands to gain even more in terms of cost-effectiveness and consistency in meeting security and regulatory compliance.

BRIEF SUMMARY OF THE INVENTION

The present invention is a system for cross-selling products and/or services across an enterprise comprising: (a) a plurality of point of contact systems; (b) an enterprise-level decision engine; (c) a plurality of line-of-business decision engines; (d) connection, protocol and message adaptors; and (e) a publish-subscribe message framework; wherein the point of contact systems generate cross-sell request messages; wherein the connection, protocol and message adaptors enable the point of contact systems to communicate with the enterprise-level decision engine and the enterprise-level decision engine to communicate with the line-of-business decision engines; wherein the point of contact systems communicate directly with the enterprise-level decision engine; wherein the enterprise-level decision engine obtains data used in generating cross-sell offers from internal and/or external data sources and derives characteristics based on data contained in the cross-sell request message and/or data obtained from the internal and/or external data sources; wherein the characteristics derived by the enterprise-level decision engine are shared with one or more line-of-business decision engines and used by the line-of business-level decision engines to generate cross-sell offer decisions; wherein the enterprise-level decision engine determines whether a particular line-of-business decision engine will be requested to generate a cross-sell offer decision based on business rules implemented at an enterprise level; wherein the cross-sell offer decisions are based on business rules implemented at the enterprise level and, if the enterprise-level decision engine determines that one or more line-of-business decision engines will be requested to generate a cross-sell offer decision, at a line-of-business level, and wherein the enterprise-level business rules and the line-of-business-level business rules are managed independently of one another; wherein the publish-subscribe message framework allows data to be published at an enterprise level and subscribed to by the line-of-business decision engines according to business rules established at the line-of-business level; wherein if a line-of-business decision engine is requested to generate a cross-sell offer decision, then the line-of-business decision engine applies its business rules to determine whether an offer will be made to a particular consumer or consumers with respect to one or more products or services and generates a cross-sell offer decision, and wherein the line-of-business decision engine returns the cross-sell offer decision to the enterprise-level decision engine; and wherein the enterprise-level decision engine stores data to and retrieves data from both an operational and an analytics data repository, and wherein said data includes information about cross-sell request messages, cross-sell offer decisions, and offers.

In a preferred embodiment, the present invention further comprises a runtime environment, wherein the cross-sell request message is sent by a point of contact system to the runtime environment, wherein a validation message handling module performs preliminary validation on the cross-sell request message using either Extensible Markup Language schema definitions or custom message validation routines, and wherein an error response is created if invalid data is encountered, and the error response is logged and returned to the point of contact system that generated the cross-sell request message. Preferably, after a cross-sell request message undergoes preliminary validation, a transform message handling module is used to map each source field in the cross-sell request message to a target field in a standard message format, and if the cross-sell request message is in a format other than the standard message format, then the transform message handling module transforms the cross-sell request message into the standard message format. Preferably, a user of the present invention has a specific instance of the present invention, and after a cross-sell request message undergoes preliminary validation and a cross-sell request message in a format other than the standard message format is transformed into the standard message format, the cross-sell request message is routed to the user's specific instance of the present invention, the message undergoes additional data validation, an error response is created if invalid data is encountered, and the error response is logged and returned to the point of contact system that generated the cross-sell request message.

In a preferred embodiment, the enterprise-level decision engine performs data acquisition, offer acquisition, and offer arbitration functions. Preferably, the line-of-business decision engines perform data acquisition tasks to augment the data acquisition performed at the enterprise level, derive line-of-business-specific characteristics based on data contained in the cross-sell request message and/or internal or external data acquired at either an enterprise or a line-of-business level, use the characteristics to generate cross-sell offer decisions, and implement product optimization rules.

In a preferred embodiment, compliance controls are implemented at an enterprise level. In yet another preferred embodiment, a degree of control is enforced at an enterprise level and a degree of autonomy is allowed at the line-of-business level, and the degree of control that is enforced at the enterprise level and the degree of autonomy that is allowed at the line-of-business level are defined by user-implemented business rules in the enterprise decision engine and line-of-business decision engines, and the user can establish rules to address situations in which the enterprise-level and line-of-business-level rules conflict.

In a preferred embodiment, a user populates cross-sell core and user-defined tables with data that establishes which products and services to attempt to cross-sell, what external and/or internal data should be obtained for each potential consumer or product cross-sell candidate, and how to arbitrate between multiple product and/or service offers when necessary, and the cross-sell core and user-defined tables are populated at the enterprise level. In yet another preferred embodiment, the user determines what data to publish at the enterprise level, and the published data is sent to the line-of-business decision engines at runtime via the publish-subscribe message framework.

In a preferred embodiment, the present invention further comprises a design-time environment that enables a user to define decision policy thresholds and decision-related values at both an enterprise and a line-of-business level and to change these thresholds and values in real-time. In yet another preferred embodiment, the publish-subscribe message framework sends messages between the enterprise-level decision engine and the line-of-business decision engines, each message comprises a structure, and the structure of each message comprises name/value pair characteristics. Preferably, the name/value pair characteristics are incorporated in the operational and analytics data repositories.

In a preferred embodiment, the enterprise-level decision engine comprises configurable tables, and the configurable tables comprise a core cross-sell candidate inclusion table, a core cross-sell candidate exclusion tables a product control table, a core product consumer arbitration table, and a core product arbitration table. Preferably, the configurable tables further comprise a client cross-sell candidate inclusion table and a client cross-sell candidate exclusion table, and the client cross-sell candidate inclusion table and the client cross-sell candidate exclusion table allow the user to augment or replace the functionality provided by the core cross-sell candidate inclusion and exclusion tables. Preferably, the core cross-sell candidate inclusion table and the client cross-sell candidate inclusion table each comprises one or more output columns, and the output columns of the core cross-sell candidate inclusion table and the client cross-sell candidate inclusion table are the same. Preferably, the core cross-sell candidate exclusion table and the client cross-sell candidate exclusion table each comprises one or more output columns, and the output columns of the core cross-sell candidate exclusion table and the client cross-sell candidate exclusion table are the same.

Preferably, the configurable tables further comprise a client product consumer arbitration table and a client product arbitration table, and the client product consumer arbitration table and the client product arbitration table allow the user to augment or replace the functionality provided by the core product consumer arbitration and product arbitration tables. Preferably, the core product consumer arbitration table and the client product consumer arbitration table each comprises one or more output columns, and the output columns of the core product consumer arbitration table and the client product consumer arbitration table are the same. Preferably, the core product arbitration table and the client product arbitration table each comprises one or more output columns, and the output columns of the core product arbitration table and the client product arbitration table are the same. Preferably, the configurable tables comprise table lookup and result parameters, and a user may specify whether a particular parameter is modifiable in real-time or only in design-time.

In a preferred embodiment, the present invention further comprises core and client-defined arbitration tables, wherein each arbitration table contains predefined characteristics, wherein a user assigns thresholds and weights to each of the predefined characteristics in the tables, wherein there is a likelihood of a consumer accepting an offer for a particular product or service, wherein there is a value to an enterprise of a particular product or service if a consumer accepts an offer for that product or service, wherein the arbitration tables are used to establish a score associated with the likelihood of a consumer accepting an offer for a particular product or service and to establish a score associated with the value to an enterprise of a particular product or service if a consumer accepts an offer for that product or service, and wherein the arbitration tables exist at the enterprise level. Preferably, the scores established by the client-defined arbitration tables are added to the scores established by the core arbitration tables to produce an aggregate score, offers are ranked based on an arbitrating value, and the aggregate score is used as the arbitrating value in ranking offers.

In a preferred embodiment, the requests for cross-sell offer decisions are sent by the enterprise-level decision engine simultaneously to more than one line-of-business decision engine, and the cross-sell offer decisions are generated simultaneously by the line-of-business decision engines to which the requests for cross-sell offer decisions are sent. Preferably, after the enterprise-level decision engine receives the cross-sell offer decisions from the line-of-business decision engines, each cross-sell offer decision with an actual offer is evaluated in an offer arbitration process. Preferably, as part of the offer arbitration process, minimum score thresholds and maximum number of offers to be presented per consumer and per request are evaluated to determine whether an offer will be presented to a consumer. Preferably, after minimum score thresholds and maximum number of offers to be presented per consumer and per request are evaluated and a determination is made to present an offer to a consumer, the system determines whether the offer will be returned to the requesting point of contact system for immediate presentation to the consumer and/or whether it will be stored for future retrieval and presentation to the consumer. Preferably, if an offer is to be returned to the requesting point of contact system, then a standard cross-sell response message is formatted by the enterprise-level decision engine, and if the requesting point of contact system is not capable of accepting the standard cross-sell response format, then the message is transformed into a format that is accepted by the requesting point of contact system, and the cross-sell response message is sent to the requesting point of contact system by the enterprise-level decision engine and stored for future retrieval and presentation to the consumer.

In a preferred embodiment, the point of contact systems generate cross-sell result interaction update messages that identify types of interactions that have occurred with a particular consumer relative to an offer that has been presented to the consumer. Preferably, the system updates counts and values associated with an offer based on information contained in the cross-sell result interaction update message.

In a preferred embodiment, the point of contact systems generate offer lookup request messages that contain one or more consumer offer identifying parameters that are used to locate previously generated available, unused, and unexpired offers, and data associated with the available, unused and unexpired offers is returned to the point of contact system that sent the offer lookup request message. Preferably, the system is deployed in an enterprise, the enterprise comprises multiple lines of business, and the data stored in the analytics repository is used by the enterprise and the lines of business to analyze and adjust their cross-sell and credit risk strategies.

The present invention also covers a method for cross-selling products and/or services across an enterprise comprising: providing a plurality of point of contact systems; providing an enterprise-level decision engine; (c) providing a plurality of line-of-business decision engines; (d) providing connection, protocol and message adaptors; and providing a publish-subscribe message framework; wherein the point of contact systems generate cross-sell request messages; wherein the connection, protocol and message adaptors enable the point of contact systems to communicate with the enterprise-level decision engine and the enterprise-level decision engine to communicate with the line-of-business decision engines; wherein the point of contact systems communicate directly with the enterprise-level decision engine; wherein the enterprise-level decision engine obtains data used in generating cross-sell offers from internal and/or external data sources and derives characteristics based on data contained in the cross-sell request message and/or data obtained from the internal and/or external data sources; wherein the characteristics derived by the enterprise-level decision engine are shared with one or more line-of-business decision engines and used by the line-of business-level decision engines to generate cross-sell offer decisions; wherein the enterprise-level decision engine determines whether a particular line-of-business decision engine will be requested to generate a cross-sell offer decision based on business rules implemented at an enterprise level; wherein the cross-sell offer decisions are based on business rules implemented at the enterprise level and, if the enterprise-level decision engine determines that one or more line-of-business decision engines will be requested to generate a cross-sell offer decision, at a line-of-business level, and wherein the enterprise-level business rules and the line-of-business-level business rules are managed independently of one another; wherein the publish-subscribe message framework allows data to be published at an enterprise level and subscribed to by the line-of-business decision engines according to business rules established at the line-of-business level; wherein if a line-of-business decision engine is requested to generate a cross-sell offer decision, then the line-of-business decision engine applies its business rules to determine whether an offer will be made to a particular consumer or consumers with respect to one or more products or services and generates a cross-sell offer decision, and wherein the line-of-business decision engine returns the cross-sell offer decision to the enterprise-level decision engine; and wherein the enterprise-level decision engine stores data to and retrieves data from both an operational and an analytics data repository, and wherein such data includes information about cross-sell request messages, cross-sell offer decisions, and offers.

In a preferred embodiment, the present invention further comprises providing a runtime environment, wherein the cross-sell request message is sent by a point of contact system to the runtime environment, wherein a validation message handling module performs preliminary validation on the cross-sell request message using either Extensible Markup Language schema definitions or custom message validation routines, and wherein an error response is created if invalid data is encountered, and the error response is logged and returned to the point of contact system that generated the cross-sell request message. Preferably, after a cross-sell request message undergoes preliminary validation, a transform message handling module is used to map each source field in the cross-sell request message to a target field in a standard message format, and if the cross-sell request message is in a format other than the standard message format, then the transform message handling module transforms the cross-sell request message into the standard message format. Preferably, a user of the present invention has a specific instance of the present invention, and after a cross-sell request message undergoes preliminary validation and a cross-sell request message in a format other than the standard message format is transformed into the standard message format, the cross-sell request message is routed to the user's specific instance of the present invention, the message undergoes additional data validation, an error response is created if invalid data is encountered, and the error response is logged and returned to the point of contact system that generated the cross-sell request message.

In a preferred embodiment, the enterprise-level decision engine performs data acquisition, offer acquisition, and offer arbitration functions. Preferably, the line-of-business decision engines perform data acquisition tasks to augment the data acquisition performed at the enterprise level, derive line-of-business-specific characteristics based on data contained in the cross-sell request message and/or internal or external data acquired at either an enterprise or a line-of-business level, use the characteristics to generate cross-sell offer decisions, and implement product optimization rules.

In a preferred embodiment, compliance controls are implemented at an enterprise level. In yet another preferred embodiment, a degree of control is enforced at an enterprise level and a degree of autonomy is allowed at the line-of-business level, the degree of control that is enforced at the enterprise level and the degree of autonomy that is allowed at the line-of-business level are defined by user-implemented business rules in the enterprise decision engine and line-of-business decision engines, and the user can establish rules to address situations in which the enterprise-level and line-of-business-level rules conflict.

In a preferred embodiment, a user populates cross-sell core and user-defined tables with data that establishes which products and services to attempt to cross-sell, what external and/or internal data should be obtained for each potential consumer or product cross-sell candidate, and how to arbitrate between multiple product and/or service offers when necessary, and the cross-sell core and user-defined tables are populated at the enterprise level. In yet another preferred embodiment, the user determines what data to publish at the enterprise level, and the published data is sent to the line-of-business decision engines at runtime via the publish-subscribe message framework.

In a preferred embodiment, the present invention further comprises a design-time environment that enables a user to define decision policy thresholds and decision-related values at both an enterprise and a line-of-business level and to change these thresholds and values in real-time. In yet another preferred embodiment, the publish-subscribe message framework sends messages between the enterprise-level decision engine and the line-of-business decision engines, each message comprises a structure, and the structure of each message comprises name/value pair characteristics. Preferably, the name/value pair characteristics are incorporated in the operational and analytics data repositories.

In a preferred embodiment, the enterprise-level decision engine comprises configurable tables, and the configurable tables comprise a core cross-sell candidate inclusion table, a core cross-sell candidate exclusion table, a product control table, a core product consumer arbitration table, and a core product arbitration table. Preferably, the configurable tables further comprise a client cross-sell candidate inclusion table and a client cross-sell candidate exclusion table, and the client cross-sell candidate inclusion table and the client cross-sell candidate exclusion table allow the user to augment or replace the functionality provided by the core cross-sell candidate inclusion and exclusion tables. Preferably, the core cross-sell candidate inclusion table and the client cross-sell candidate inclusion table each comprises one or more output columns, and the output columns of the core cross-sell candidate inclusion table and the client cross-sell candidate inclusion table are the same. Preferably, the core cross-sell candidate exclusion table and the client cross-sell candidate exclusion table each comprises one or more output columns, and the output columns of the core cross-sell candidate exclusion table and the client cross-sell candidate exclusion table are the same.

Preferably, the configurable tables further comprise a client product consumer arbitration table and a client product arbitration table, and the client product consumer arbitration table and the client product arbitration table allow the user to augment or replace the functionality provided by the core product consumer arbitration and product arbitration tables. Preferably, the core product consumer arbitration table and the client product consumer arbitration table each comprises one or more output columns, and the output columns of the core product consumer arbitration table and the client product consumer arbitration table are the same. Preferably, the core product arbitration table and the client product arbitration table each comprises one or more output columns, and the output columns of the core product arbitration table and the client product arbitration table are the same. Preferably, the configurable tables comprise table lookup and result parameters, and a user may specify whether a particular parameter is modifiable in real-time or only in design-time.

In a preferred embodiment, the present invention further comprises providing core and client-defined arbitration tables, wherein each arbitration table contains predefined characteristics, wherein a user assigns thresholds and weights to each of the predefined characteristics in the tables, wherein there is a likelihood of a consumer accepting an offer for a particular product or service, wherein there is a value to an enterprise of a particular product or service if a consumer accepts an offer for that product or service, wherein the arbitration tables are used to establish a score associated with the likelihood of a consumer accepting an offer for a particular product or service and to establish a score associated with the value to an enterprise of a particular product or service if a consumer accepts an offer for that product or service, and wherein the arbitration tables exist at the enterprise level. Preferably, the scores established by the client-defined arbitration tables are added to the scores established by the core arbitration tables to produce an aggregate score, offers are ranked based on an arbitrating value, and the aggregate score is used as the arbitrating value in ranking offers.

In a preferred embodiment, the requests for cross-sell offer decisions are sent by the enterprise-level decision engine simultaneously to more than one line-of-business decision engine, and the cross-sell offer decisions are generated simultaneously by the line-of-business decision engines to which the requests for cross-sell offer decisions are sent. Preferably, after the enterprise-level decision engine receives the cross-sell offer decisions from the line-of-business decision engines, each cross-sell offer decision with an actual offer is evaluated in an offer arbitration process. Preferably, as part of the offer arbitration process, minimum score thresholds and maximum number of offers to be presented per consumer and per request are evaluated to determine whether an offer will be presented to a consumer. Preferably, after minimum score thresholds and maximum number of offers to be presented per consumer and per request are evaluated and a determination is made to present an offer to a consumer, a determination is made as to whether the offer will be returned to the requesting point of contact system for immediate presentation to the consumer and/or whether it will be stored for future retrieval and presentation to the consumer. Preferably, if an offer is to be returned to the requesting point of contact system, then a standard cross-sell response message is formatted by the enterprise-level decision engine, and if the requesting point of contact system is not capable of accepting the standard cross-sell response format, then the message is transformed into a format that is accepted by the requesting point of contact system, and the cross-sell response message is sent to the requesting point of contact system by the enterprise-level decision engine and stored for future retrieval and presentation to the consumer.

In a preferred embodiment, the point of contact systems generate cross-sell result interaction update messages that identify types of interactions that have occurred with a particular consumer relative to an offer that has been presented to the consumer. Preferably, counts and values associated with an offer are updated based on information contained in the cross-sell result interaction update message.

In a preferred embodiment, the point of contact systems generate offer lookup request messages that contain one or more consumer offer identifying parameters that are used to locate previously generated available, unused, and unexpired offers, and data associated with the available, unused and unexpired offers is returned to the point of contact system that sent the offer lookup request message. Preferably, the method is used in an enterprise, the enterprise comprises multiple lines of business, and the data stored in the analytics repository is used by the enterprise and the lines of business to analyze and adjust their cross-sell and credit risk strategies.

BRIEF DESCRIPTION OF THE DRAWINGS

FIG. 4 is an exemplary screen shot of the cross-sell inclusion table of the present invention.

FIG. 6 is an exemplary screen shot of the product control table of the present invention.

FIG. 11 is an exemplary screen shot of the product consumer arbitration table of the present invention.

FIG. 12 is an exemplary screen shot of the product arbitration table of the present invention.

FIG. 13 is a portion of a standard request message showing how name/value pair characteristics are defined and included at various points throughout the message within the context of the present invention.

REFERENCES

1 Channel code column (of cross-sell inclusion table)
2 POC event code column (of cross-sell inclusion table)
3 POC product code column (of cross-sell inclusion table)
4 Consumer POC account relationship column (of cross-sell inclusion table)
5 LOB code column (of cross-sell inclusion table)
6 Product code column (of cross-sell inclusion table)
7 CSC inclusion reason column (of cross-sell inclusion table)
8 Rule section (of user-implemented rule)
9 Do if true section (of user-implemented rule)
10 Do if false section (of user-implemented rule)
11 Comments section (of user-implemented rule)
12 Rule tools section (of user-implemented rule)
13 LOB code column (of product control table)
14 Product code column (of product control table)
15 Bureau column (of product control table)
16 Consumers sent to LOB engine column (of product control table)
17 LOB DE sequence column (of product control table)
18 Create CSC for secondary consumer column (of product control table)
19 Consumers to pull credit report for column (of product control table)
20 Reuse of consumer data column (of product control table)
21 Existing offer prospects processing column (of product control table)
22 LOB code column (of cross-sell exclusion table)
23 Product code column (of cross-sell exclusion table)
24 Exception location ID column (of cross-sell exclusion table)
25 CSC exclusion reason column (of cross-sell exclusion table)
26 LOB code column (of product consumer arbitration table)

27 Product code column (of product consumer arbitration table)
28 Sub-product code column (of product consumer arbitration table)
29 Valued customer code column (of product consumer arbitration table)
30 Low stated income column (of product consumer arbitration table)
31 High stated income column (of product consumer arbitration table)
32 Home loan with us flag column (of product consumer arbitration table)
33 Product consumer score column (of product consumer arbitration table)
34 Product consumer score reason column (of product consumer arbitration table)
35 LOB code column (of product arbitration table)
36 Product code column (of product arbitration table)
37 Sub-product code column (of product arbitration table)
38 Low offer amount column (of product arbitration table)
39 High offer amount column (of product arbitration table)
40 Product score column (of product arbitration table)
41 Product score reason column (of product arbitration table)
42 Characteristic element (in a standard request message)
43 Name attribute of a characteristic element (in a standard request message)
44 Value attribute of a characteristic element (in a standard request message)

DETAILED DESCRIPTION OF INVENTION

A. Overview

Figure 1:
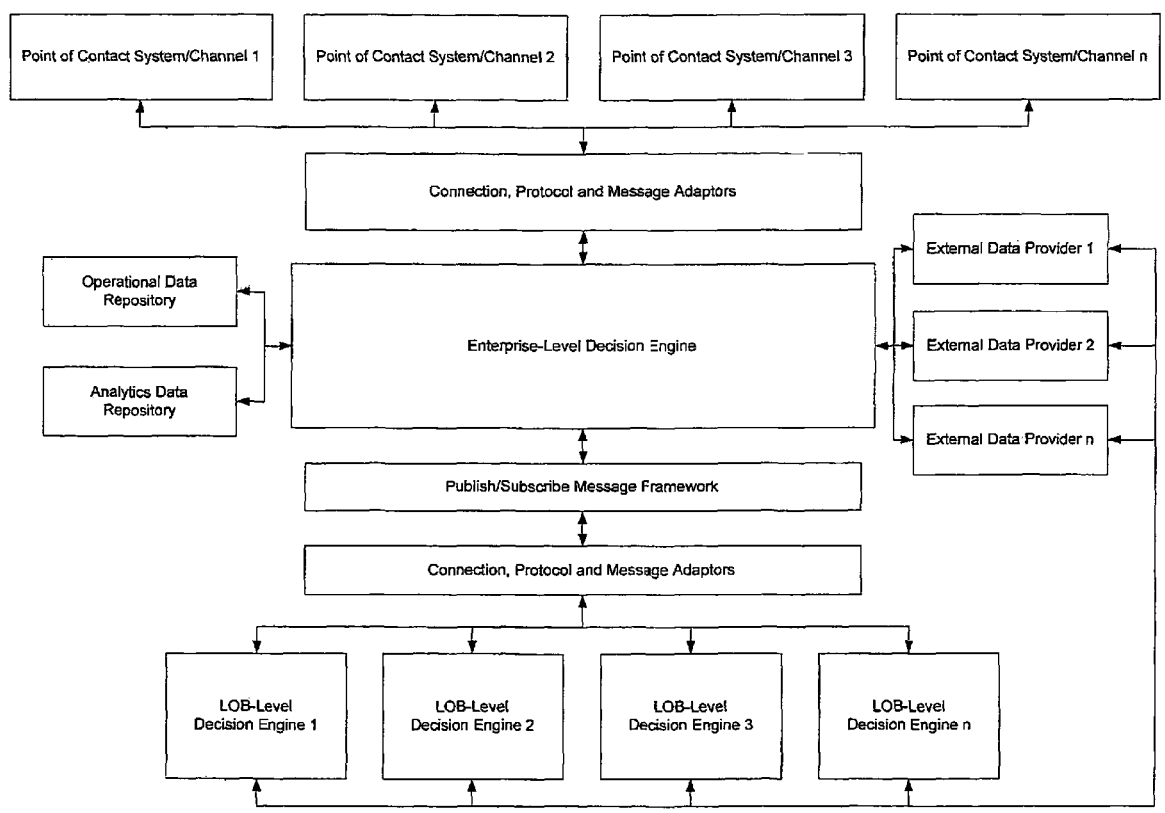
FIG. 1 is a high-level overview diagram of the present invention showing the primary components and their integration with one or more other components.

The present invention is a system and method for cross-selling products and services across an enterprise that provides a solution to all of the challenges described above. FIG. 1 is a high-level overview diagram of the present invention showing the primary components of the present invention and their integration with one or more other components. The point of contact (POC) systems deployed by users of the present invention are shown at the top of the diagram. POC systems communicate with the enterprise-level decision engine through connection, protocol, and message adaptors. These adaptors make it possible for the enterprise-level decision engine to receive a standard message format regardless of both the communication protocol and the message format used by the POC system. The messages sent from a POC system to the enterprise-level decision engine pass through these adaptors, and where necessary, are transformed as needed into the standard message format used by the enterprise-level decision engine. The enterprise-level decision engine stores data to and retrieves data from both an operational and an analytics data repository. The enterprise-level decision engine obtains additional data used in generating cross-sell offers from any number of external data sources and requests cross-sell offer decisions from any number of line of business (LOB) decision engines using a publish-subscribe message framework and connection, protocol, and message adaptors to execute the requests.

The publish-subscribe message framework allows new data to be published at the enterprise level on an as-needed basis, while allowing the separate LOB engines to subscribe to the newly published data when it is convenient and appropriate for them to do so. Flexibility in passing data from the enterprise to the LOB level enables integration with any number of LOB engines without forcing each LOB to remain in lock-step with the enterprise-level deployment timeline.

Figure 2:
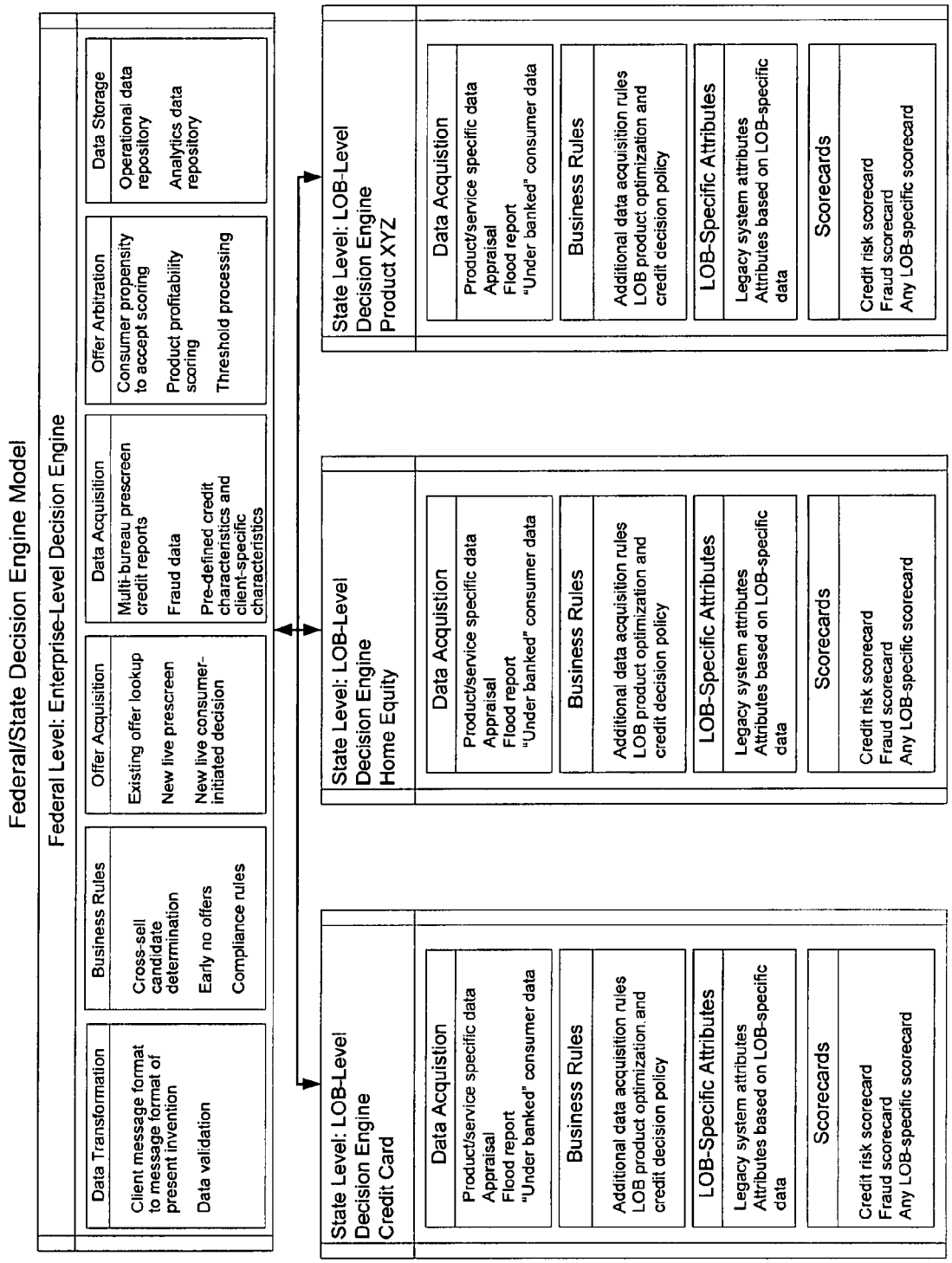
FIG. 2 is a diagram of the federal/state decision engine model of the present invention.

The ability to cooperatively cross-sell products and services from multiple LOBs within a single enterprise, while providing excellent consumer service by basing cross-sell offers on a comprehensive view of the consumer, is addressed in the present invention through a federal/state decision engine model (see FIG. 2). Similar to the U.S. form of government, where federal laws and policies are combined with state laws and policies to provide a comprehensive legal structure, the federal/state decision engine model allows policy and strategies to be implemented at either level, depending on where they are most effective. FIG. 2 shows the enterprise-level decision engine at the top of the diagram with the LOB-level decision engines deployed below it. Each of the types of functions implemented at the enterprise and LOB levels is shown within the context of those decision engines.

Data transformation from the client message format to the standard message format and message data validation are the first functions performed at the enterprise-level. If the client is able to send the standard message format, then no transformation is needed. If the client sends a message in any format other than the standard message format of the present invention, then transformation is involved. Business rules, including cross-sell candidate determination, early no-offer decision rules and compliance rules are also implemented and performed at the enterprise-level. For each cross-sell candidate, offer acquisition tasks including existing offer lookups, new live prescreens and new live consumer-initiated decisions are invoked through the enterprise-level decision engine.

When an offer acquisition task requires additional data, including, but not limited to, prescreen credit reports from any of the credit bureaus and fraud data, that data is acquired using the data acquisition functions at the enterprise-level. Any characteristics based on this additional data may be derived at the either the enterprise or the LOB level. Once offers have been generated, offer arbitration is performed to determine the consumer propensity to accept a given offer, the product profitability if accepted, and the quality and number of offers to be presented to the consumer. The final functions performed at the enterprise-level include the storage of all data related to the cross-sell process in both an operational data repository and an analytics data repository.

At the state level, LOB decision engines are deployed with the ability to perform all functions needed to determine if one or more consumers should be offered a particular product. These functions include data acquisition tasks to augment the data acquisition performed at the enterprise level, business rules to determine what, if any, additional data is needed, LOB product optimization rules that identify the best fit product for the consumer(s), and any credit decision policy rules. The state-level engines are also able to derive LOB-specific characteristics from the cross-sell request message and/or external data acquired at either the enterprise or LOB level. These characteristics can include both legacy or existing system characteristics and any characteristics based on LOB-specific data. Scorecards (business rules) used to determine credit risk, fraud risk or any other LOB-specific score are also implemented by the state-level decision engines.

The LOB decision engines can be implemented as part of the present invention or hosted "in house" by the user of the present invention or by an independent, third-party ASP. The LOB decision engines are integrated with the enterprise decision engine using connection, protocol and message adaptors as shown in FIG. 1. The degree of control enforced at the enterprise level and the degree of autonomy allowed at the LOB level are defined by the user as business rules in the enterprise and LOB decision engines. These business rules are completely managed by the user of the present invention and can easily be modified in the design-time environment of the present invention. They are managed independently of one another as enterprise- and LOB-level goals and strategies change over time. The barrier to cooperative cross-sell strategies between multiple LOBs is eliminated by allowing each LOB to implement its own cross-sell and credit risk strategies. At the same time, enterprise-level control is maintained when and where it is needed most.

With this barrier removed, the entire enterprise is able to implement effective cross-sell strategies to ensure that the right offers of products and/or services are made at each point of contact with any consumer, regardless of which LOB originates the offer. The enterprise-level decision engine determines which products and/or services to consider offering to a given consumer and then asks the appropriate LOB-level engine for a decision on whether or not to make an offer, and if so, what the details of that offer should be. This allows the LOB to tailor its particular response to the consumer needs and situation. The enterprise-level decision engine then provides offer arbitration designed to evaluate the consumer's propensity to accept any given offer (i.e., whether the offer is right for the consumer) as well as the profitability of the product or service if accepted (i.e., whether the offer is right for the product/service provider).

The offer arbitration process also takes any additional parameters into consideration, such as the channel through which the consumer has made contact and what time of day it is, and then tailors the number and type of offers presented based on those parameters. The present invention supports the use of traditionally sourced data, such as credit reports and user-provided consumer information, as well as newly available data from innovative sources for consumers with little or no credit history, public record data regarding property ownership, etc. The present invention imposes no limitations on the number and type of data sources that can be accessed.

Determining exactly what external data may be needed in order to effectively cross-sell the appropriate products or services and obtaining that data from external sources such as credit bureaus and fraud data vendors can be performed at either the enterprise or the LOB decision engine level. When appropriate, data that can be shared between the LOBs is obtained once, at the enterprise level, greatly reducing the time and expense involved in obtaining that data. In addition, characteristics can be derived at the enterprise level from either internal or external data sources, providing the highest degree of manageability and cost efficiency, ensuring compliance through consistency of the derived characteristics, and avoiding LOBs independently implementing the logic needed to derive the characteristics themselves. For example, the number of times a consumer has been 30 days past due on any of her credit cards in the last 12 months is derived based on credit report data from any of the credit bureaus. Each credit bureau represents delinquencies in its unique proprietary format. Examining this data and deriving the 30 days past due characteristic at the enterprise level eliminates the redundancy of each LOB engine implementing the logic to perform the same function and the risk of discrepancy between the LOB engine implementations.

Compliance controls, such as ensuring that consumer identity and/or credit bureau data is handled appropriately, are implemented at the enterprise level, allowing a greater level of control and consistency than when these controls are implemented independently by each LOB in a variety of POC systems. In turn, this simplifies the process of proving compliance with legislation such as the Gramm-Leach-Bliley Act (GLBA) and the Fair Credit Reporting Act (FCRA) and protecting against significant punitive penalties and potentially unrecoverable damage to a financial institution's reputation.

The federal/state decision engine model also facilitates integration with multiple POC systems emanating from a variety of consumer contact channels. The POC systems are required to communicate with only the enterprise-level decision engine; they are not required to communicate with each of the various LOB engines from which they seek products or services. This configuration greatly reduces the integration complexity for the user of the present invention. Connection, protocol and message adaptors are an integral part of the present invention. These adaptors allow the user of the present invention to send a standardized or custom message and receive a standardized or custom response, using any communication protocol available to the POC system. Different POC systems may pick and choose between standard or custom messaging and communication protocols. This flexibility enables integration with any number of POC systems that are in place today and provides the ability to easily add, replace or retire POC systems over time.

In situations where a product/service provider already has one or more LOB decision engines in place, whether they are implemented and hosted in-house or by an independent third party, the present invention provides the ability to integrate the enterprise-level decision engine and its related benefits with those existing LOB decision engines. Standard and custom connection, protocol, and message adaptors are used to facilitate communication between the enterprise-level engine and the LOB level engine(s) as shown in FIG. 1. In a preferred embodiment, new LOB decision engine implementations use standard message formats and protocols, but existing/legacy engines are accommodated through the connection, protocol and message adaptors.

In addition to supporting instant prescreen processing and traditional consumer-initiated credit decisioning, the present invention provides a means of housing offers from pre-approval/direct mail campaigns for additional offer re-enforcement when a consumer makes contact through one of the many channels and POC systems available to them. Offer re-enforcement capability allows the user of the present invention to re-present a previously mailed offer to a consumer at a time when the consumer is more likely to be receptive to the offer than when she is sorting through her mail.

In a preferred embodiment, all data related to a given cross-sell event, whether it is the first or hundredth contact with a consumer, is captured in both an operational and an analytics data repository. The operational data repository stores all data related to the processing performed when a consumer contact is made. Previously generated offers, whether from an instant prescreen or batch direct mail campaign, may be stored here for re-presentment.

The analytics data repository captures the data needed by the enterprise and the LOBs to analyze their cross-sell and credit risk strategies. All aspects of the cross-sell process, including the consumer's response to any offers presented, how many times the consumer was presented a given offer before she accepted it, the scorecard data used in any credit decisioning, etc., are stored for analytic purposes. In situations where regulatory requirements limit the information that a financial service provider may know about the consumer (e.g., non-consumer initiated prescreens), the analytics data is rendered anonymous, thereby allowing the user of the present invention to analyze data while remaining compliant with regulatory requirements.

B. Design-Time and Runtime Environments

The present invention includes two independent environments that work together to provide a complete solution: a design-time environment and a runtime environment. The design-time environment allows the end user (typically a financial institution business analyst) to configure various parameters including marketing strategies, corporate lending policy and business rules. The runtime environment processes system-to-system request messages by evaluating the messages, executing rules and policy as configured in the design-time environment, acquiring internal and external data, and returning responses to the calling system in real-time. These environments apply to both the enterprise-level decision engine and the LOB-level decision engines.

During design-time, the user of the present invention specifies exactly what cross-sell strategy he wishes to implement. This strategy is implemented using several core and user-configurable processes identified in FIG. 3.

Figure 3:
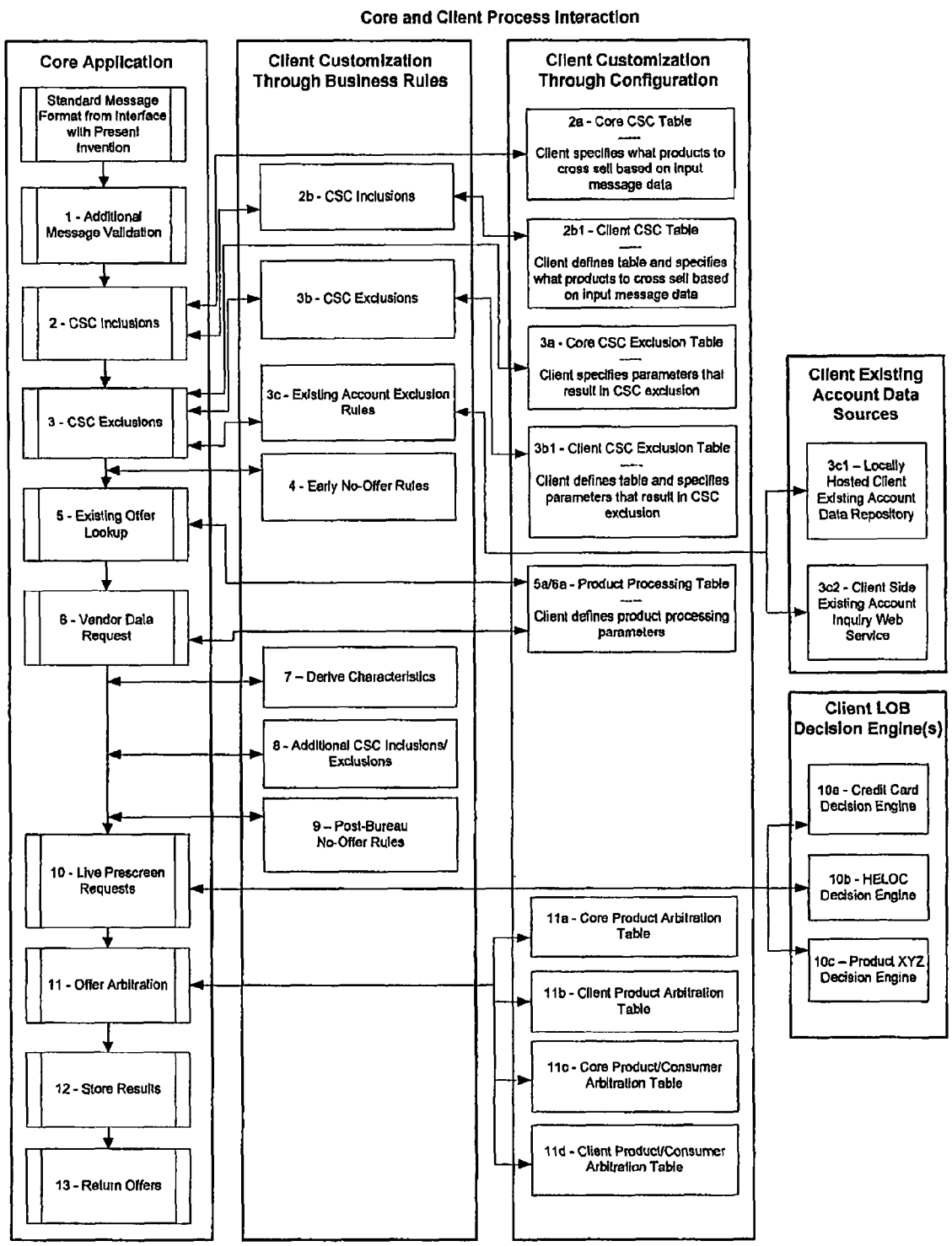
FIG. 3 is a diagram showing the interaction between the various core and client processes of the present invention.

FIG. 3 calls out each of the processes involved in determining cross-sell offers, with each process grouped into one of five categories. The first process category (core application) includes enterprise-level elements for which the user does not have any need to modify any aspect of the process. For example, the point at which message validation occurs and the details of that message validation are defined and implemented by the core application. The user has no need to modify where in the process this validation occurs or any of the details regarding what validation is performed. The second process category (client customization through business rules) shows the points at which the user implements the business rules that are not dictated by the core processes. These include such things as specific enterprise-level no-offer rules and user-defined and user-populated tables that extend the functionality of the core processes. Several of the processes shown in this category may be performed at either the enterprise- or LOB-level. For example, rules for determining existing account exclusions, post-bureau no-offers and deriving characteristics may be implemented as enterprise-level rules or as LOB-level rules, depending on whether the logic involved is common to all LOBs or unique per LOB.

The third process category (client customization through configuration) includes the enterprise-level elements of the core product that the user configures to meet its unique cross-sell objectives. This configuration is accomplished by specifying table lookup and result parameters using the graphical user interface of the design-time environment. It also includes the points at which the user populates the tables defined in the second category. The fourth process category covers the processes through which the user can provide additional existing account information of the consumers for whom cross-sell offers are being sought. The fifth and final process category identifies the LOB decision engines responsible for making the decision as to whether a given consumer should be offered a particular product and if so, under which terms. In the course of making this decision, the LOB decision engines may perform some of the same processes available at the enterprise-level. For example, the LOB decision engines may acquire external data not already obtained at the enterprise level and derive characteristics from that data for use in rendering a decision.

The user of the present invention populates the cross-sell core and user-defined tables with data that establishes which products and services to attempt to cross-sell, what external data should be obtained for each potential consumer or product cross-sell candidate, and how to arbitrate between multiple product and/or service offers when necessary. The user populates these tables using the table editor functionality in the design-time environment. The user can enter the data through direct user input or import of existing spreadsheet data. FIG. 4 is an example of the cross-sell inclusion table as it appears in the design-time environment. Because these changes are implemented using a pre-established structure that is accessible through a design-time graphical user interface, changes to strategy can be made easily by the user without a lengthy development and testing cycle involving scarce technical resources.

Figure 5:
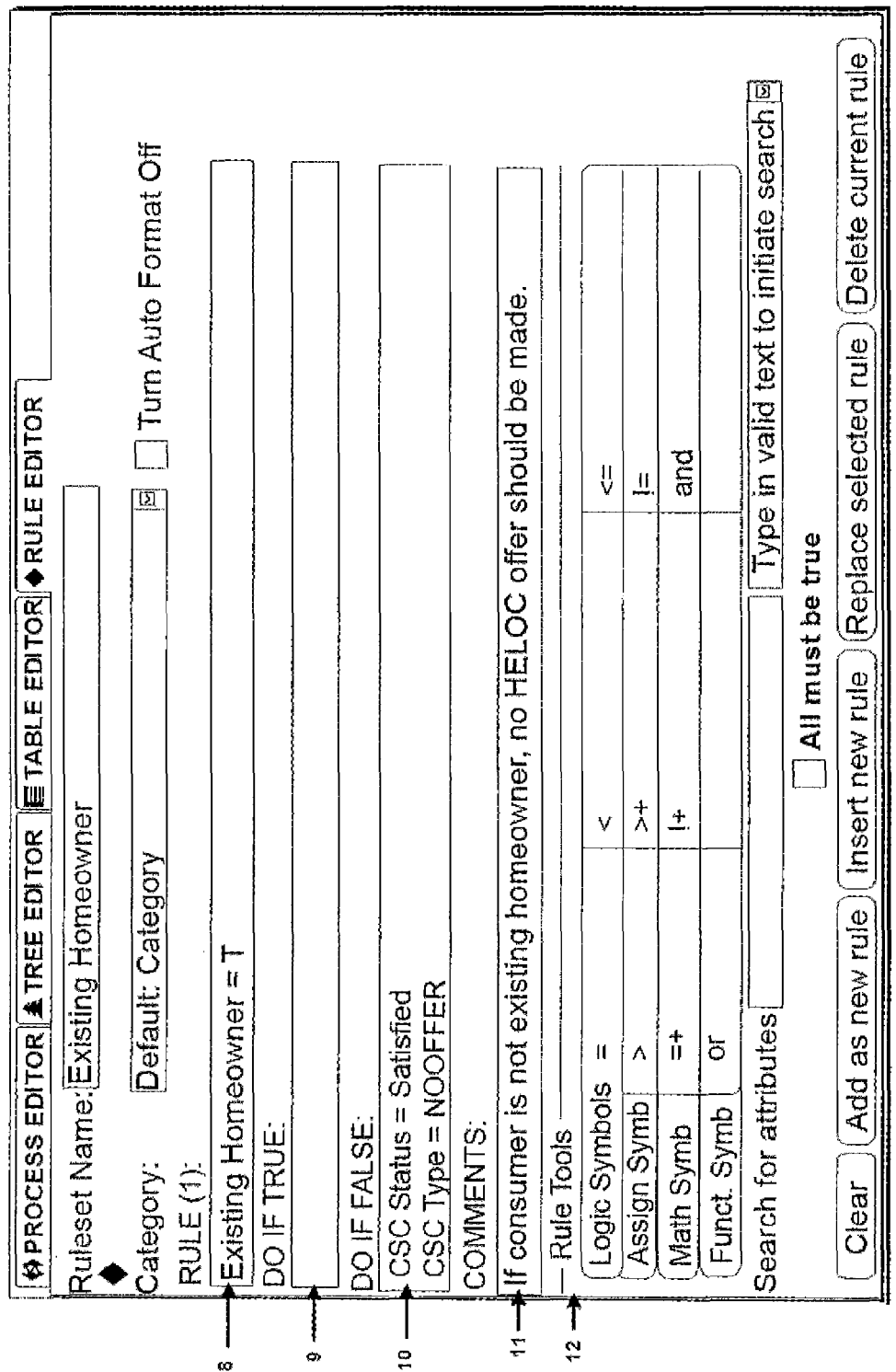
FIG. 5 is an exemplary screen shot of a user-implemented rule within the context of the present invention.

During design time, the user also implements specific rules that govern such processing as early no-offers for specific cross-sell candidate products and services based on underage consumer, home ownership, or any other input parameter. The user implements these rules using the rule editor functionality in the design-time environment. FIG. 5 is an example of a user-implemented rule as it appears in the design-time environment. These rules allow the user to avoid acquiring costly external data for cross-sell candidate products or services that are known to be unviable options for the particular consumer.

Making the best cross-sell decisions about a wide variety of products and services is generally aided by the use of credit report data, fraud check data, and a number of other external data sources that reveal consumers spending habits and current needs. The data that is obtained and how it is shared across LOBs has a significant bearing on the overall cost and, therefore, profitability of generating offers. During design time, the user of the present invention specifies what data should be obtained for any given product or service for which a decision needs to be made. The user populates product control tables using the table editor functionality in the design-time environment. The user can enter the data through direct user input or import of existing spreadsheet data. FIG. 6 is an example of the product control table as it appears in the design-time environment. For example, if a particular consumer has cross-sell candidates established for both a home equity line of credit and a credit card, the LOB responsible for decisioning those products may choose to use different credit reporting agencies. Information about the consumer to whom the offer may be made is also incorporated into the choice of external data to be acquired. For example, a cross-reference of zip code to preferred credit bureau may be employed, using the consumer's residence address zip code to determine which of several credit bureaus from which to obtain data.

At design time the user determines exactly what data to publish by selecting any available characteristic, whether the characteristic is acquired from a credit bureau file, a fraud check, or derived from the input message or from externally acquired data. At runtime, all characteristics that were selected for publishing are sent to the LOB decision engines via the publish-subscribe message framework. This framework allows LOB decision engines to subscribe to certain characteristics while disregarding others, and it also enables the enterprise engine to operate entirely independent of the LOB engines. Users can release changes to the enterprise level at any time without being subject to the customary requirement of coordinating corresponding LOB engine changes that are implemented simultaneously. In this manner, the publish-subscribe message framework of the present invention reduces the cost and complexity associated with modification of highly integrated computer systems, thereby enabling banks to modify enterprise credit lending policy and marketing strategies more easily and quickly than was previously possible.

Figure 7:
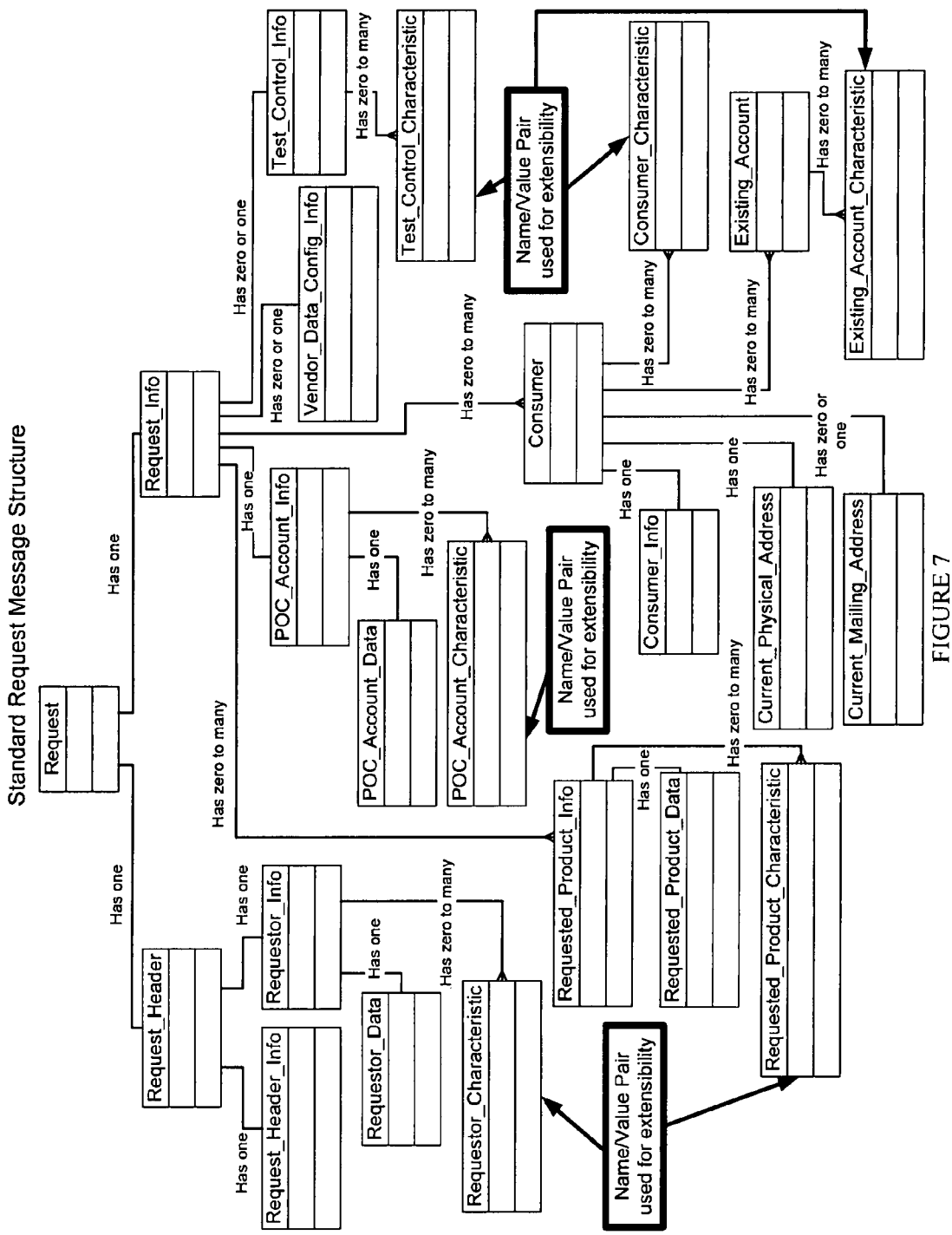
FIG. 7 is a diagram of the standard request message structure of the present invention.
Figure 8:
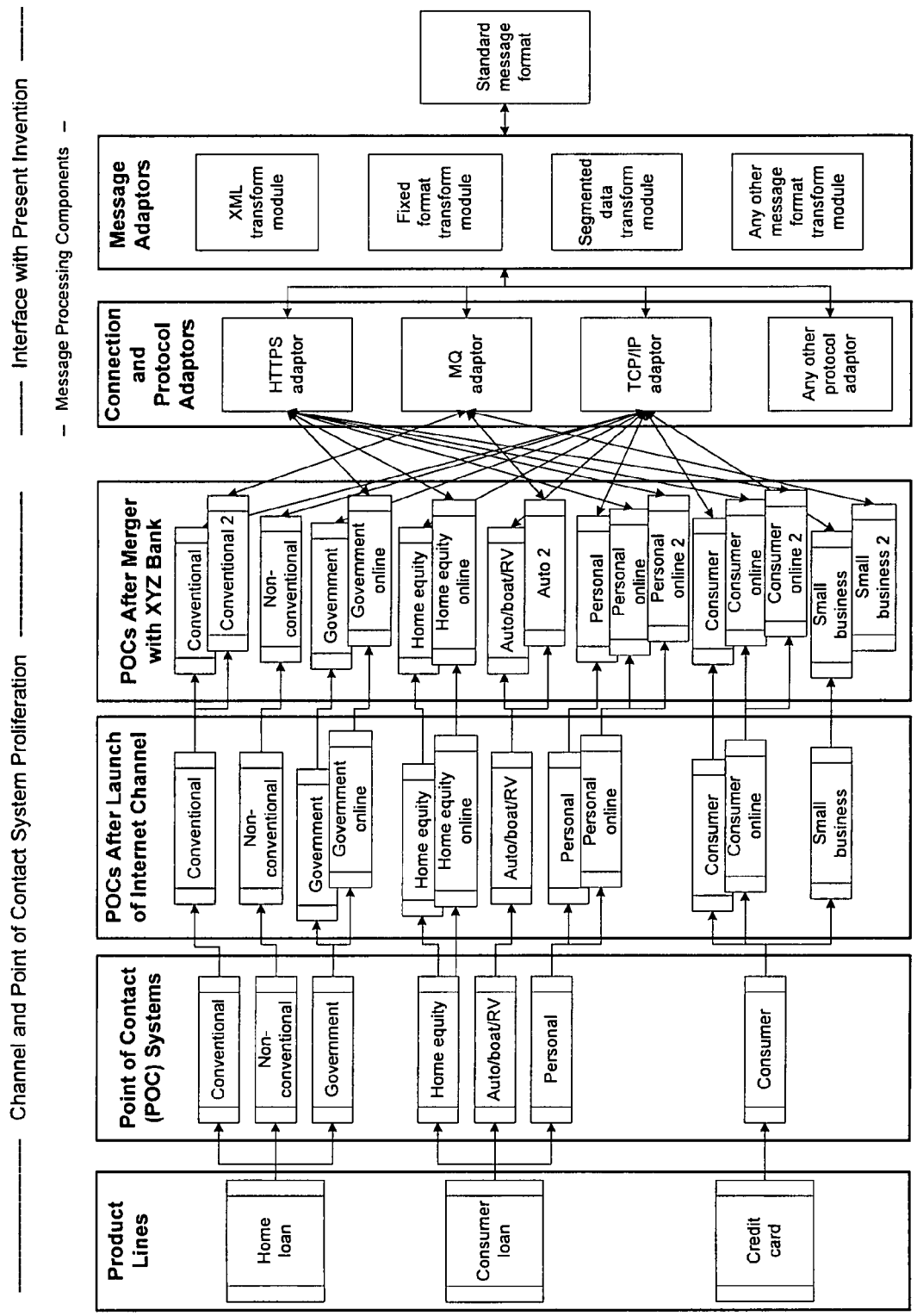
FIG. 8 is a high-level diagram showing the components involved in the integration between the present invention and the prolific distribution channels and POC systems many financial institutions have in place.

The runtime environment is comprised of several components involved in the receipt and processing of messages, sent by the user of the present invention, with the intent of requesting cross-sell opportunities, updating status information associated with the presentation and acceptance of cross-sell offers, and executing subsequent lookup of those offers. The cross-sell request message is the first message processed in the course of generating a cross-sell offer. FIG. 7 shows the structure of a sample request message and identifies the various elements included in the message. This message identifies the consumer(s) for whom offers are being requested, provides the location and channel through which the consumer is making contact, and includes additional request data. FIG. 8 shows the high-level components involved in the integration between the present invention and the prolific channel and POC systems many financial institutions have in place today. This figure is organized into two sections that distinguish between the user's channels/POC systems and the points at which these channels/POC systems integrate with the present invention.

The first section (channel and point of contact system proliferation) of FIG. 8 shows how a relatively small number of product lines (home loan, consumer loan, and credit card) results in a large number of POC systems for financial institutions that actively seek growth through new distribution channels and/or mergers and acquisitions. The initial set of seven POC systems for the three product lines are shown in the "Point of contact (POC) systems" column. The "POCs after launch of Internet channel" column shows how those seven POC systems grow to 12 with the introduction of a new distribution channel, and the "POCs after merger with XYZ Bank" column shows how the POC systems grow to 17 with the merger of two financial service providers.

The second section of FIG. 8 (Interface with Present Invention) shows how even a large number of user POC systems can integrate with the present invention through a small number of connection, protocol and message adaptors, resulting in a single, standardized message format, which is then used to generate cross-sell results. The "connection and protocol adaptors" column shows the three most commonly used adaptors and the ability of the present invention to deploy an adaptor to work with any other messaging needs from the user's POC systems. The "message adaptors" column also shows the three most commonly used message transform modules and the ability to deploy a module to work with any non-standard message format sent by a POC system. The output from the connection, protocol, and message adaptors is the standard message format used by the enterprise-level decision engine.

Figure 9:
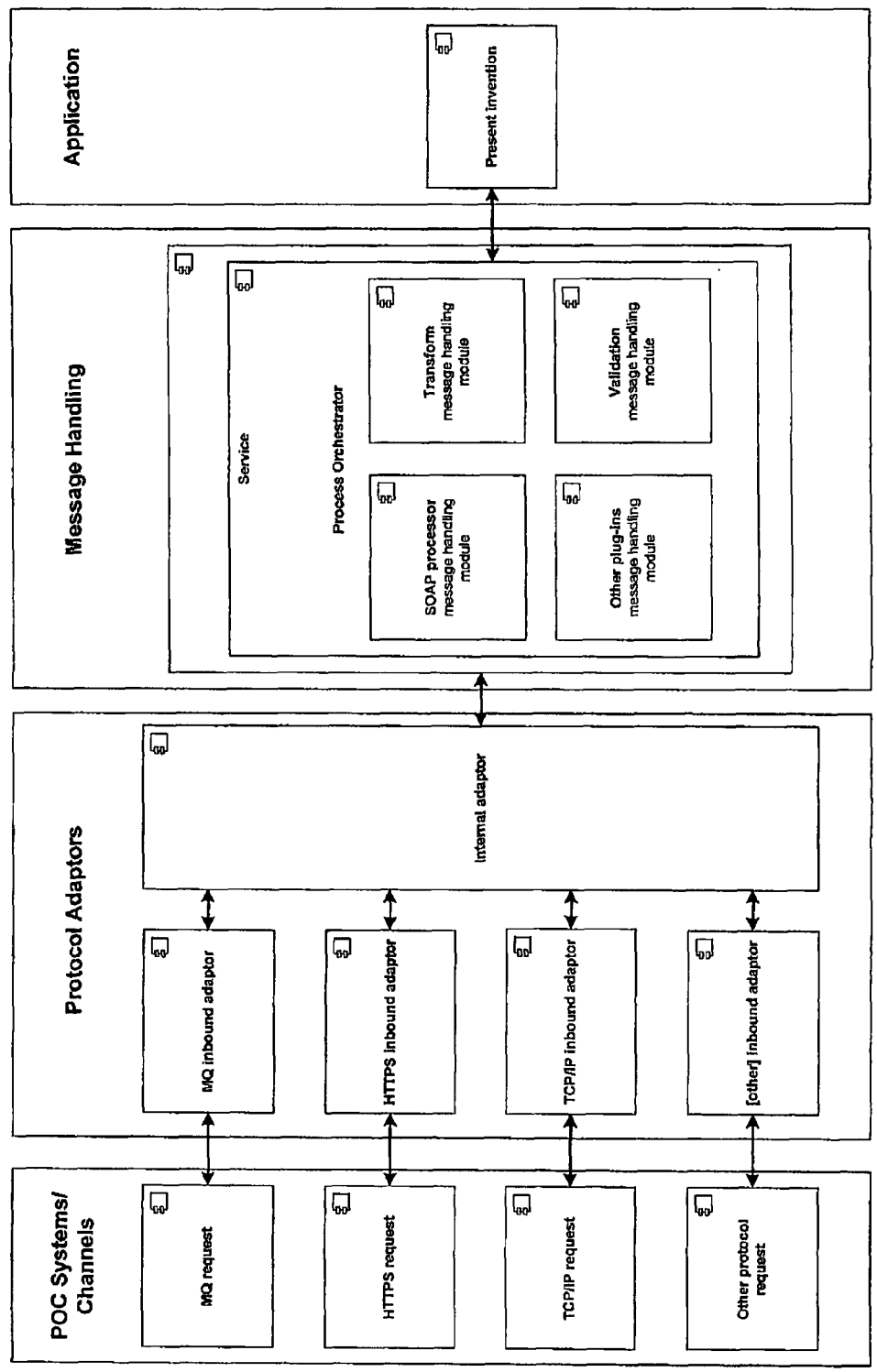
FIG. 9 is a detailed diagram of the adaptors implemented by the present invention to facilitate integration with the many POC systems and distribution channels with respect to which a user may wish to implement the cross-sell capability of the present invention.

FIG. 9 is a more detailed diagram of the adaptors implemented by the present invention to facilitate this integration. This diagram shows the various types of electronic communication protocols that may be used by any of the user channels or POCs, as well as the protocol adaptors responsible for handling each message. The three most commonly used protocols and adaptors, MQ (message queuing), HTTPS (Hyper Text Transfer Protocol, Secure) and TCP/IP (Transmission Control Protocol/Internet Protocol) are shown along with the ability of the present invention to deploy any other protocol adaptor needed to support messages from the user's POC systems. It also identifies the message handling processes, including a SOAP (Service Oriented Architecture Protocol) processor message handling module responsible for handling increasingly popular Web Service messages, a validation message handling module responsible for ensuring the data sent by the POC system conforms to expected formatting, and a transform message handling module responsible for creating the standard format message passed to the runtime environment of the present invention. The message handling portion of the present invention is also able to deploy other plug-in message handling modules for adapting POC system messages which are not accounted for by the more commonly used modules.

In a preferred embodiment, both the design-time and the runtime environments of the present invention are implemented in a manner that allows them to meet the high-volume, high-availability requirements of today's marketplace while ensuring the highest level of security needs are also met. Runtime components of the present invention are preferably implemented in a manner that allows them to be deployed in at least two geographically distributed processing facilities using multiple distributed servers in each facility. These facilities should each meet the certification requirements of a Class 1 Computer Facility as defined in the Statement on Auditing Standards Number 70 (SAS 70) issued by the Auditing Standards Board or the American Institute of Certified Public Accountants. The distributed server environment should provide the ability to balance transaction load volume based on server availability. This environment should also allow the introduction of additional servers to manage peak demand spikes and overall scalability requirements. Given the sensitive nature of the consumer data involved in performing cross-sell functions, the runtime environment preferably provides data encryption as data moves between the various components of the present invention and also when that data is at rest in both the operational and analytic data repositories.

In a preferred embodiment, user permissions and profiles are defined and managed by designated administrators of the design-time environment, ensuring only the appropriate users have access to manage the policies, strategies, and business rules defined in the present invention.

1. Design-Time Environment

In the design-time environment, the user of the present invention (typically a financial institution business analyst) defines marketing and cross-sell strategies, corporate lending policy, compliance controls, and derived characteristic definitions through configurable tables and business rules. The design-time environment provides independent implementation and management of the enterprise-level decision engine and each LOB decision engine. User logon and permissions are managed separately for each decision engine, allowing the financial institution to control which users have access to each decision engine and what functions they can perform in each decision engine.

Raw data from the cross-sell request message and any internal or external data obtained at the enterprise or LOB level is available to use in business rules. Business rule writers often prefer to write rules against characteristics that are derived from this raw data because these characteristics can be defined to account for the distinguishing feature or quality in which the business analyst is interested. An example of such a characteristic would be the number of bankruptcies in the last seven years for any consumer included in the cross-sell request message. The raw bankruptcy information included in a consumer's credit report does not lend itself to writing a simple rule that checks to see if any bankruptcies exist. Deriving the characteristic from the raw data allows the user to write a simple rule that checks to see if the number of bankruptcies in the last seven years is greater than zero.

At the enterprise level, the configurable tables of the decision engine address cross-sell candidate (CSC) inclusion, CSC exclusion, external data requirements and offer arbitration when multiple offers are available. The CSC inclusion process includes a core table defined by the present invention and populated by the user (see FIG. 3, process 2*a*). The cross-sell inclusion table, shown in FIG. 4, includes the most commonly used input parameters from the cross-sell request message created and sent by the user's POC system. The user populates the table with the combination of input parameters that may be sent in the cross-sell request message, and for each combination of parameters, specifies the appropriate product(s) to be considered for cross-sell.

Channels from which a cross-sell request message may be sent are specified in the channel code column 1. The point of contact event code representing the activity the consumer was performing in the POC system, such as opening a new checking account or withdrawing cash from an automated teller machine (ATM), is specified in the POC event code column 2. The type of product the consumer was acting on in the POC system (e.g., checking account, home loan, etc.) and the consumer's relationship to that account are specified in the POC product code column 3 and the consumer POC account relationship column 4, respectively. For the combinations of channel code, POC event code, POC product code and consumer POC account relationship, the LOB code column 5 and product code column 6 are used to identify which LOB and product are to be cross-sold. Each line in the table is also associated with a unique reason code specified in the CSC inclusion reason column 7. This information is part of the data captured at runtime, allowing the user to analyze the results of its cross-sell strategy.

In addition to the core CSC inclusion table, the user may define and populate a unique client CSC inclusion table (see FIG. 3, processes 2b and 2b1). This table is defined using any of the available input data as parameters, allowing the client to augment or replace the functionality provided by the core CSC inclusion table. This client-defined table provides the flexibility needed to ensure that the user's cross-sell strategy is easily implemented even when the core CSC inclusion table does not meet all of the user's needs.

Both the core and client CSC inclusion tables are implemented using a graphical user interface that gives the user the ability to define which parameters can be modified in real time and which parameters must be changed as part of a planned release process. For example, each of the columns in the CSC inclusion table described above may be configured to allow real-time or design-time only modifications. Enabling real-time modifications allow the user to immediately adjust which products are cross-sold for a given combination of input parameters. Enabling design-time only modifications for some or all of the columns allows the user to make changes that are deployed in a larger planned release process. In either case, tables are managed by users from the enterprise or LOB levels, eliminating the need to involve scarce technical resources and lengthy development and testing processes.

Figure 10:
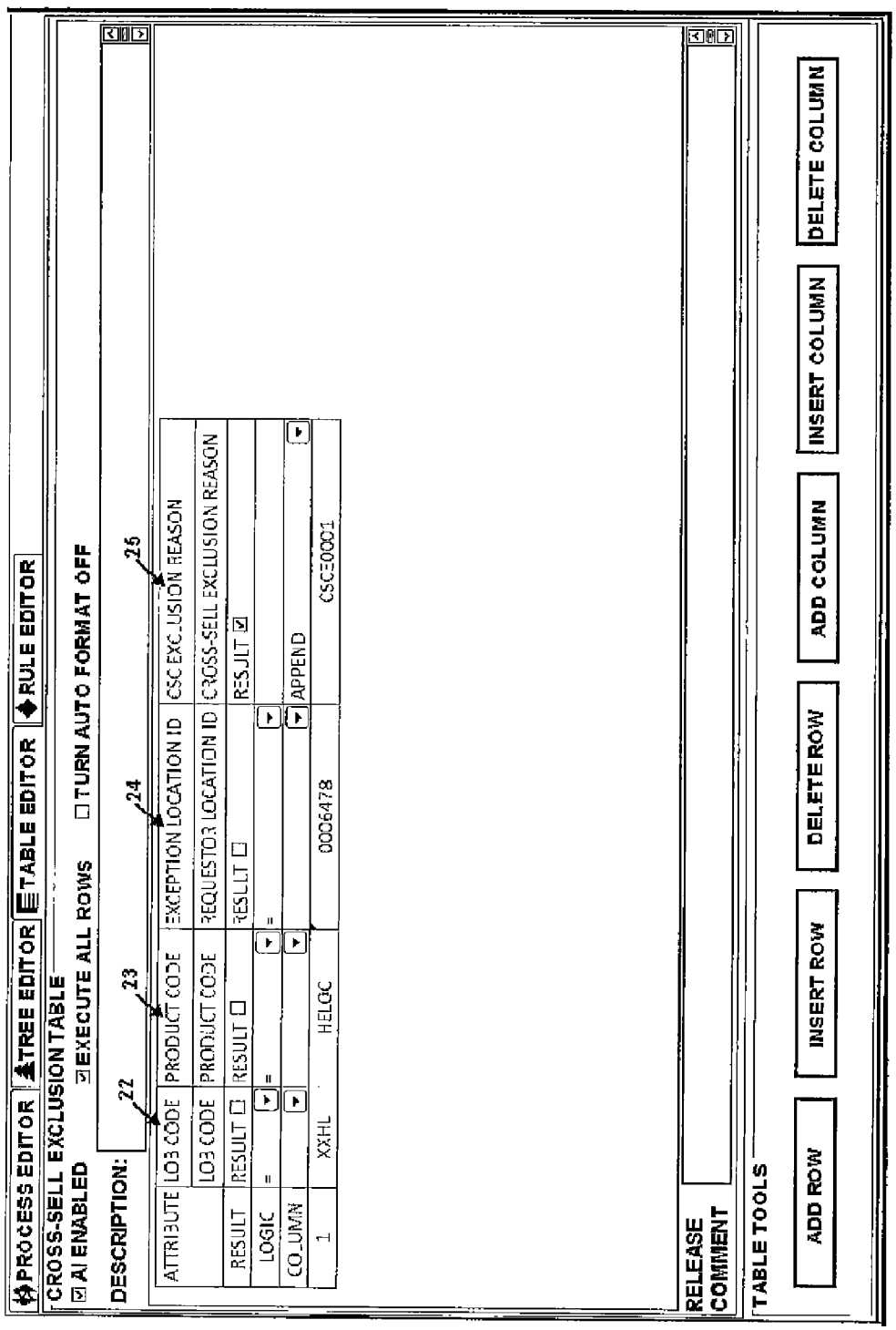
FIG. 10 is an exemplary screen shot of the cross sell exclusion table of the present invention.

The CSC exclusion process also includes a core table defined by the present invention and populated by the user (see FIG. 3, process 3a). The Cross-Sell Exclusion Table, shown in FIG. 10, allows the user to identify products that should be excluded from cross-sell consideration based on data contained in the cross-sell request message. For example, Tom Consumer may be a cross-sell candidate for a credit card and a home equity line of credit, but he is making contact through a new branch location, and the employees at that location have not been trained to present home equity line of credit offers. In the core CSC exclusion table, the user enters data in the LOB code column 22, the product code column 23 and exception location ID column 24 to represent the scenarios that should be excluded due to training or any other business reason. Each line in the table is also associated with a unique value from the CSC exclusion reason column 25, providing additional data for use in analyzing cross-sell strategy. As with the CSC inclusion tables, there is also a client-defined CSC exclusion table allowing the user to augment or replace the exclusion functionality provided by the core table (see FIG. 3, processes 3b and 3b1).

The present invention imposes no restrictions on what data can be used as input parameters in either the client-defined CSC inclusion or the client-defined CSC exclusion table. Regardless of the input parameters used, each table will include the same output columns as the core tables. Specifically, for the client-defined CSC inclusion table, each row will include an LOB code, a product code and a CSC reason, and the client-defined CSC exclusion table will include a CSC exclusion reason. This allows the client-defined tables to extend the functionality of the core tables since the output from the tables is in the same format regardless of which table produced the output.

For each cross-sell candidate, external data is generally needed for each consumer related to the candidate product. For example, cross-selling a credit card to Tom Consumer may require a credit report from TransUnion, while cross-selling Tom an auto loan may require a credit report from Equifax. In the Product Control Table, shown in FIG. 6, the user of the present invention specifies which data is needed and where to obtain it for each consumer associated with a cross-sell candidate product. The product control table also specifies how to handle cross-sell request messages where more than one consumer is included in the message. Each CSC represents a specific LOB and product to be cross-sold. The user will populate the LOB code column 13 and the product code column 14 of the product control table with each possible combination of LOB and product to be cross-sold. The remaining columns in the table are used to specify what processing will be performed for each combination.

The bureau column 15 identifies which, if any, credit bureaus are to be used to obtain credit report data, and in which order the bureaus are to be accessed in the event a preferred credit bureau is not available at the time a cross-sell request message is processed. In the consumers sent to LOB engine column 16 the user specifies which consumer(s) to send to an LOB engine when there is more than one consumer in the cross-sell request. The LOB DE sequence column 17 is used to specify ordering and dependencies of calls to the LOB engines. Standard processing is for all calls to be sent simultaneously. The LOB dependency sequence column allows the user to override this standard processing. The create CSC for secondary consumer column 18 is used to identify whether separate CSCs are to be created when there are multiple consumers in a request or whether the consumers are to be combined. For example, Tom and Sally Consumer may both get separate CSCs for their own credit cards, but they may be combined into a single CSC for a HELOC.

Similarly, the consumers to pull credit reports for column 19 identifies which consumers to obtain credit reports for when more than one consumer is included on a given CSC. The reuse of consumer data column 20 is used to determine if multiple CSCs for a given consumer can use the same instance of the consumer's credit report or if separate credit reports must be obtained for each CSC being considered. In the existing offer prospects processing column 21, the user specifies which consumers must be present in order to re-present a previously generated offer that was intended for multiple consumers.

Once all cross-sell offers have been established, the process of offer arbitration is used to establish a priority for each offer. Priority is established based on the consumer's likelihood of accepting the offer and the profitability of the offer if it is accepted. Separate core and client-defined arbitration tables are available for the user of the present invention to establish this priority. In the core arbitration tables, the user assigns thresholds and weights to each of the predefined parameters in the tables. FIG. 11 shows the table used to establish the score associated with the likelihood of a consumer accepting an offer for a particular product. FIG. 12 shows the table used to establish the score associated with the value to the enterprise of a particular product if the consumer accepts the offer for that product. In both of these tables, the user specifies the threshold values along with a score and reason for each threshold. In the client-defined tables, the user can either augment or replace the functionality provided by the core tables. Any scores produced by the client-defined tables are simply added to any scores produced by the core tables, and the resulting aggregate score is then used as the arbitrating value in ranking offers.

In addition to the processing tables described above (see FIGS. 4-6 and 10-12), the user of the present invention uses the design-time environment to specify policy and strategy business rules that are input as logical expressions in the cross-sell process flow. For example, at runtime, based on data provided in the cross-sell request message, cross-sell candidates for both a credit card and a home equity line of credit are established for Tom Consumer. After obtaining external data on Tom, it is determined that he is not currently a homeowner; therefore, no offer should be made for that product. In this case, the user of the present invention defines a specific business rule, which runs after the external data has been obtained, to check if the consumer is a homeowner, and if not, renders a no-offer on the home equity line of credit cross-sell candidate.

FIG. 5 shows the design-time component that is used to specify this rule. In the rule section 8 of the design-time screen, the user specifies what data is evaluated and what criteria it is evaluated for. In the example in FIG. 5, the existing homeowner flag is checked to see if it is true. The do if true section 9 is used to specify any values to be set for specific characteristics if the rule evaluation is true. Similarly, the do if false section 10 is used to specify any values to be set for specific characteristics if the rule evaluation is false. The comments section 11 is used to explain any complex logic or processing that may not be intuitively apparent in any of the sections above. The rule tools section 12 may be used to construct the logic in the rule section.

Derived characteristic definitions are also implemented in the design-time environment. The user of the present invention uses the graphical user interface to implement all logic associated with deriving characteristics from data contained in the cross-sell request message as well as any externally acquired data. For example, credit report data from each of the three primary credit bureaus typically contains payment history information for all outstanding debts a consumer may have. In its raw form, this data is informative, but most lenders prefer to implement credit policy rules using characteristics derived from this raw data. For example, consider a derived characteristic that represents the number of times the consumer has been 30 days delinquent on any outstanding debt in the last 12 months. The user implements logic to derive this characteristic from the raw credit report data, at the enterprise-level decision engine, and then shares this characteristic with each of the LOB decision engines that need it to render the decision of whether or not to make an offer to the consumer.

2. Runtime Environment

Execution/message processing begins with the messaging interface through which cross-sell opportunities are requested, updated, and retrieved for presentation to the consumer. The POC system through which a consumer makes contact (see FIGS. 8 and 9) formats data used to request cross-sell opportunities and sends a cross-sell request message to the present invention. This data may be formatted directly into the standard cross-sell request XML message format or any non-standard message format, which is then mapped to the standard cross-sell request format through the use of connection, protocol and message adaptors implemented by the present invention.

For POC systems that send a non-standard message format, a mapping process is performed by one or more of the message adaptor modules shown in FIG. 8. This mapping process identifies each source field in the send message and maps it to a target field in the standard message format. In cases where the sent data requires transformation, the message adaptor module performs that transformation as well. For example, all dates in the standard message format are expected to be in YYYYMMDD format. If a POC system sends dates in MMDDYYYY format, they are transformed into standard message format during the mapping process.

Once the data used to request cross-sell opportunities has been formatted by the POC system, it is sent by the POC system to the runtime environment utilizing the message processing components of the present invention shown in FIGS. 8 and 9. Data is sent using any connection mechanism and messaging protocol, including, by way of example, TCP/IP over a dedicated frame relay connection, HTTPS post over the Internet or IBM's MQ Series over a leased line. A series of communication protocol adaptors used by the present invention allow virtually any method of system-to-system connectivity between the POC system and the runtime environment. FIG. 8 depicts the messaging connection and protocol options available for sending message data to the present invention.

When the message is received in the runtime environment, it undergoes preliminary validation for expected content. This preliminary validation is performed in the validation message handling module shown in the message handling section of FIG. 9, using the appropriate XML schema definition (XSD) if the user of the present invention has sent one of the standard cross-sell XML messages. The message is validated using custom message validation routines if the user does not send one of the standard cross-sell XML messages. In either case, if invalid data is encountered, an error response is returned to the calling financial institution containing a predefined error code as well as the name and values of the invalid field(s). This error response is then used by the calling system of the present invention to determine the nature of the problem and take corrective actions to remedy the error. If an error is encountered, the present invention records the transaction and error information to allow for full reconciliation of the messages sent, received, and processed.

Once the message has passed the preliminary data validation step, it is transformed into the standard message format that is used for processing by the present invention. The use of a standard message format allows the user of the present invention to write processing logic and rules against the message data with full assurance that the data complies with an expected format, no matter what format the POC system uses when sending the original message. FIG. 9 depicts the components involved in the message transformation process.

The formatted message is sent from the data transformation process to the routing component of the present invention, which is responsible for invoking the user's specific instance of the present invention. Once the message has been forwarded, it undergoes additional data validation (see FIG. 3, process 1) beyond what is performed by the validation message handling module (see FIG. 9). This validation includes checks for logical consistency of data, such as joint/ married consumers in a message, as well as specific combinations of processing parameters. Again, if invalid data is encountered, an error response is created informing the sender of the nature of the error and the data names and values that caused the error. The transaction and error response is logged for reconciliation purposes and returned to the sender.

Once the message has passed the secondary validation step, the process of cross-sell candidate (CSC) determination begins (see FIG. 3, processes 2, 2a, 2b and 2b1). Using cross-sell core and user-defined CSC inclusion tables, each consumer included in the message is checked to determine the products and/or services for which to seek offers. The CSC inclusion tables use data included in the request message to establish a collection of zero or more candidates. FIG. 4 depicts an example of a cross-sell candidate inclusion table, showing what parameters are considered and the resulting product candidate(s). Each product candidate that is established has a unique reason code assigned, allowing for future analysis of cross-sell strategy.

Following, the CSC inclusion process, the present invention provides for CSC exclusions, again using cross-sell core and user-defined tables (see FIG. 3, processes 3, 3a, 3b, 3b1, 3c, 3c1 and 3c2). The exclusion process is intended to allow the user to exclude anomalies such as offers for which the sender of the message has not been trained to present. For example, Tom Consumer may normally be considered for both a credit card and a home equity line of credit (HELOC) offer, but he has made contact at his local branch, and that particular branch has not yet been trained to present HELOC offers. The HELOC CSC is marked as excluded, leaving only the credit card candidate to be processed further. The fact that the HELOC CSC is excluded is recorded, along with the specific reason for the exclusion, to allow for analysis of the cross-sell strategy (i.e., a lost opportunity due to training schedules).

In addition to the CSC exclusion tables, an otherwise valid CSC may be excluded if the consumer is known to already own the candidate product. At this point in the process, knowledge of which products a consumer already owns may be gained in one of several ways. The consumer's existing products may be included in the original message, the user may provide a batch file of existing products by consumer, or the user may provide a real-time inquiry service allowing the present invention to query existing products for a given consumer. In any case, each CSC is checked against known existing products for the consumer, and if any are found for which the user should not be considered for a new offer, the CSC is marked as excluded with a specific reason code assigned.

Once the CSC inclusion and exclusion processes are complete, each CSC is evaluated against user-defined early no-offer rules (see FIG. 3, process 4). Early no-offer rules are used to render a no-offer for any CSC for which the consumer or product is not currently eligible for consideration. By way of example, the present invention might check for an under-age consumer who is not legally allowed to enter into a contract required by a particular product. Rendering an early no-offer avoids additional processing for that CSC, including costly external data acquisition and processing costs.

Following the early no-offer process, each CSC is checked to determine if a previously generated offer can be used to satisfy the CSC (see FIG. 3, processes 5 and 5a). In the original message, the user may choose to specify that existing offers are not to be used to satisfy an open CSC. Additionally, the user may specify whether or not all consumers associated with the original offer must be included in the new request message before an existing offer can be used. If allowed, the operational data repository is checked to determine if any unused, unexpired offers for the CSC product and consumer(s) exist. If found, the existing offer is used to satisfy the CSC and no further processing is needed to satisfy that particular CSC.

All remaining open CSCs are evaluated to determine the external vendor data that needs to be acquired before an offer or no-offer can be rendered for the CSC (see FIG. 3, processes 6, 6a and 7). Examples of external vendor data include one or more credit bureau files, fraud checks, Office of Foreign Asset Control list (OFAC) checks, etc. Required external vendor data requests are determined based on user-defined configuration in the cross-sell core Product Control Table (see FIG. 6). When all required data requests have been established, the present invention sends various external requests. The simultaneous nature of this type of processing greatly reduces the overall processing time in the event that multiple requests are processed. Following the receipt of external data responses, characteristics are derived based on data contained in those responses, and the responses and characteristics are associated with the appropriate CSC for further processing. In the current embodiment of the present invention, these derived characteristics include, but are by no means limited to, the user's choice from among over 390 standard credit characteristics, with no additional definition required by the user. Examples of such characteristics include a standard fraud victim flag, a do not solicit flag, the number of trades 30 days past due in past 12 months, and the number of open trades with ratio of balance to high credit limit >=75%.

Once the external data requests are processed and the characteristics are derived, each CSC is evaluated to determine if a no-offer should be rendered (see FIG. 3, process 9). Among other data, the results of any credit bureau files are evaluated to determine if the consumer(s) associated with a CSC has/have opted out of being solicited with product or service offers where credit data would be used to determine cross-sell offers. In addition to checking the opt-out status, the user of the present invention may implement any additional data evaluation rules at the enterprise level to determine if a no-offer should be rendered prior to and instead of invoking a LOB decision engine. For example, credit report files can be examined to determine if the consumer already has an active product matching the product associated with the CSC, in which case the decision to not seek another offer for that product may be made.

New cross-sell candidates are also included and existing cross-sell candidates may be excluded following the external data acquisition (see FIG. 3, process 8). For example, if external data indicates the consumer owns her home (i.e., no outstanding mortgage or equity loan exists on the home), a new CSC may be included for a home equity loan or line of credit.

At this point any remaining open CSCs are ready to be evaluated by the appropriate LOB decision engine to determine whether an offer or a no-offer should be rendered. An appropriately structured message, in the format expected by the LOB decision engine, is created for each CSC. The message includes all data known from the original request, including contact channel, consumer information, credit report, any other external data, and any characteristics derived at the enterprise level. The publish-subscribe message framework is used to construct this message and pass it to the appropriate LOB decision engine. This framework is based on a message structure, an example of which is shown in FIG. 13, that includes characteristic elements 42 expressed as name/value pairs. These name/value pair characteristics are defined for each element of the message where data may be needed in the future. With name/value pair characteristics predefined in the message, the extensive development and testing effort normally associated with adding new data to a message is eliminated as no change to the message format is required in order to send new data between the enterprise- and LOB-level decision engines. Each characteristic that needs to be sent in the message is passed as both a name attribute of a characteristic element 43 and a value attribute of a characteristic element 44. Any number of characteristics can be included in the message using name/value pair constructs.

FIG. 7 shows a sample message structure with name/value pair characteristics defined at each element that may be extended in the future. These characteristics allow for new data to be published at the enterprise level and easily passed to the LOB decision engines. The LOB decision engines are able to receive newly published data at any time. The LOB decision engines use (or subscribe) to the new data on an as-needed basis and on their release timelines. Unlike traditional messaging solutions, there is no need to coordinate release schedules between the enterprise-level decision engine and the LOB decision engines when new data is published or subscribed to. This flexibility is unprecedented in messaging formats available today.

When all messages to be sent to the LOB decision engines have been constructed, the present invention simultaneously sends them to and receives responses from each LOB engine (see FIG. 3, processes 10, 10a, 10b and 10c). The simultaneous nature of this processing greatly reduces the overall processing time in the event that multiple requests are processed. In addition to simultaneously processing requests, the user of the present invention specifies an order and dependency for each request using the LOB dependency sequence column in the product control table. Any combination of simultaneous and/or sequential processing of CSCs can be defined as needed.

When all LOB decision engine responses are returned, each CSC with an actual offer (as opposed to no-offer) is evaluated in the offer arbitration process (see FIG. 3, processes 11, 11a-11d). Using cross-sell core and user-defined tables, each consumer and consumer/product combination is scored in terms of the propensity of the consumer to accept the offer and the profitability of the offer if accepted. The user of the present invention can choose from existing parameters defined by the core invention to perform this scoring. The core product consumer arbitration table (see FIG. 11) is used to determine a portion of the overall arbitration score for each offer. In the LOB code column 26, the product code column 27 and the sub-product code column 28, the user specifies all of the LOB products and sub-products that may be offered to a consumer. The valued customer code column 29 is used to specify each of the possible codes that may be sent in the cross-sell request message, identifying any already known value assigned to the consumer by the POC system.

The low stated income column 30 and the high stated income column 31 are used to identify income ranges that will affect the arbitration score assigned. The home loan with us flag column 32 is used to factor in whether or not the consumer is known to have a existing home loan with the financial institution. For each combination of the parameters specified in the columns described above, the product consumer score column 33 and the product consumer score reason column 34 are used to specify the score and reason assigned for that particular combination of parameters.

The product arbitration table (see FIG. 12) is similar to the product consumer arbitration table in that it allows the user to specify a value in the product score column 40 and the product score reason column 41 for combinations of input parameters entered in the LOB code column 35, the product code column 36, the sub-product code column 37, the low offer amount column 38 and the high offer amount column 39 related to the product being considered. Users may also augment or replace the core invention scoring models with models of their own definition. The scores and reasons from all arbitration tables are aggregated into an overall score used to rank each offer. Details regarding each parameter used in the scoring, along with the reason a particular parameter contributed to the given score and its relative impact on the overall score, are recorded for strategy analysis purposes in the analytics data repository.

Once all product and product/consumer combination scoring has been completed, the next phase of the offer arbitration process is performed. This phase determines whether or not a given offer should be made available for presentation to the consumer. In the event of non-consumer-initiated prescreen processing, the user of the present invention is able to remain compliant with Fair Credit Reporting Act (FCRA) regulations by executing the process in an environment hosted by an independent third party acting as an agent of the various credit bureaus.

This phase of the offer arbitration process evaluates minimum score thresholds as well as the maximum number of offers to be presented per consumer and per request. Factors such as consumer contact channel and time of day can be examined to determine thresholds and maximum number of offers to be presented. For example, a request coming from the teller line in a branch at 12:30 p.m. on a Friday afternoon may be specified as having at most one offer to be returned, while a similar request at 3:00 p.m. on that same Friday may allow two or more offers to be returned. All details regarding thresholds and other factors involved in this phase of the offer arbitration process for a given request are also recorded for strategy analysis.

Following the completion of the offer arbitration process, all data related to the cross-sell request process is stored (see FIG. 3, process 12). Data related to the operational aspects of the process, such as offers generated, offer display rank, offer expiration date, etc., is stored in the operational data repository. Data related to strategy analysis, such as scoring results, parameters used in the scoring processes, etc., is stored in the analytics data repository. To comply with all regulatory requirements related to consumer privacy and non-consumer initiated pre-screen processing, confidential consumer data is rendered anonymous.

Based on the nature of the request from the user, the final step in the cross-sell request process is to determine if offers are to be returned to the requesting POC system for immediate presentation to the consumer and/or stored for future retrieval and presentation to the consumer. If offers are to be returned to the requesting POC system, the offer data, including terms and conditions, an offer ID, and any appropriate offer sales scripts or hints are formatted into a cross-sell response message that is appropriate for the specific POC system and returned using the user-preferred messaging interface (see FIG. 3, process 13). Similar to the processes described above for accepting cross-sell request messages, the present invention will format a standard cross-sell response message containing the offer data. If the user's POC system is capable of accepting the standard cross-sell response format, no additional message transformation is needed. If message transformation is needed, the transform message handling module in FIG. 9 performs this processing. In either case, the appropriate connection and protocol adaptors shown in FIGS. 8 and 9 are responsible for returning the response message over the user-preferred messaging interface.

In addition to the cross-sell request message, the present invention defines messages used to update information regarding the presentment and acceptance of offers and to query offers previously created. These messages include the cross-sell result interaction update message and the offer lookup request message, and both of these messages are sent by the POC system that is responsible for presenting offers to the consumer. These messages are received and processed by the present invention in the same manner as the cross-sell request message. Connection, protocol and message adaptors, along with data validation processing discussed above, are used in receiving and responding to these messages. The cross-sell result interaction update message identifies when one of several types of interaction have occurred relative to a given offer. These interactions include, but are not limited to, offer(s) viewed by client, offer(s) presented to consumer, consumer's preliminary response to offer(s), and consumer accepts/applies for offer(s).

When a cross-sell result interaction update message is received, the present invention locates the offer(s) specified in the message and updates all counts and status values associated with the offer. For example, when a cross-sell result interaction update message is received indicating an offer was presented to the consumer and the consumer indicated they were potentially interested, the offer presentment count is incremented by one and the consumer response status is updated to reflect the consumer's possible interest in the offer. This information is then available for use in subsequent interactions with the consumer to ensure that the user of the present invention is aware of the number of times an offer has been presented to the consumer and what that consumer's response to the offer was. These updated counts and status values become part of the data available for analysis, allowing the user of the present invention to determine the success rate of its cross-sell strategy, the average number of times an offer for a particular product is presented to a consumer before the consumer accepts the offer, and so on.

The offer lookup request message contains one or more consumer or offer identifying parameters that are used to locate any available, unused, unexpired offers that were previously generated. The data associated with those offers is returned to the POC system that sent the lookup message. The POC system responsible for presenting offers to the consumer may be different from the POC system responsible for the cross-sell request message that generated the offer to begin with. The present invention imposes no restrictions on which POC systems are responsible for generating and presenting offers. The scope of the offer lookup request is limited to the offers directly related to the lookup parameters sent in the message. For example, if the lookup request contains the customer ID for Tom Consumer, only those offers made directly to Tom will be returned.

C. Advantages Over Prior Art

Prior attempts to solve for cross-sell management typically deployed a single, monolithic software platform that was difficult, time-consuming, and risky to change. Often, changes made to meet the needs of one line of business (LOB) either ignore or adversely affect the needs of the enterprise and/or other LOBs. The present invention has addressed cross-sell management with intentionally separate components, coupled with easy-to-implement integration between those components. Specifically, the federal/state decision engine deployment model ensures that the user of the present invention can define and implement the appropriate level of enterprise control and LOB autonomy to meet its specific goals and objectives. One LOB does not adversely affect another, nor do any LOBs adversely affect the enterprise or visa versa.

Prior attempts to define cross-sell and credit decision strategies generally involve the financial institution describing its requirements to a third party who was responsible for implementing the business rules logic to implement the requirements. When the financial institution wished to make changes to the business rules in order to react to market environment changes and consumer needs, it often took months to implement, test, and deploy. The present invention provides a design-time environment in which the user can implement both enterprise- and LOB-level decision engines rules. There is no need for the user to rely on a third party to manage its rules. Although the present invention provides the framework needed to implement an effective cross-sell solution, it imposes no restrictions on the user's ability to define highly customized strategies and business rules. The design-time environment enables the user to define decision policy thresholds and other decision-related values that can be changed in real-time by an authorized user administrator. This capability allows the user to adjust cross-sell strategy, credit policy, and any other business rules without the lengthy development and testing normally associated with such changes.

Intending to provide integration between diverse point of contact (POC) systems and rule engine processing, prior art has been implemented with rigid message formats, which are difficult to modify. Adding new data to a rigid message format for use in business decision making has been a major impediment to financial institutions being able to implement new strategies and policies in their automated systems. Something as simple as adding a monthly income amount to a message format that did not previously include that data would require a coordinated release of both the sending and receiving system software and all the development and testing time associated with such a release. The present invention has solved this issue through the use of a publish-subscribe message framework and name/value pair characteristics. In the present invention, new data can easily be added to any of the messages and used in the enterprise-level and/or LOB-level decision engines. New data published at the enterprise level is subscribed to at the LOB level at a time when it is appropriate and convenient for the LOB to do so. The incorporation of name/value pair characteristics in the operational and analytics data repositories allows newly defined data to be stored without the need for new development and additional testing.

Previous attempts to integrate multiple POC systems with business decision engine functionality and external data providers commonly resulted in redundant implementations of messaging interfaces, data repositories and business rule definitions. For example, a financial institution wanting to implement cross-sell functionality with separate POC systems for checking account opening, credit card application processing and home equity application processing would deploy separate connections from each POC system to the three different credit bureaus, define the same business rules in each POC system, and store the resulting cross-sell offers in separate databases. These redundant implementations make it very difficult to maintain a high level of system availability because each implementation represents a potential point of failure. Scalability is also difficult to achieve because each separate implementation must be implemented with the ability to accommodate peak transaction volumes and future growth needs.

The present invention allows financial institutions to connect each of their POC systems to a single enterprise-level decision engine, which in turn accesses LOB-level decision engines to obtain product offers. The connections to the various credit bureaus and other external data providers are implemented once rather than separately for each POC system. Rules that belong at the enterprise level are implemented once, and rules that belong at the LOB level are implemented for each LOB requiring them. Cross-sell results are stored in a single data repository, making access for reporting and analysis far simpler than in prior art implementations. With all of these functions implemented as part of the present invention, with no redundant implementations needed, security, high availability and scalability requirements are easily met.

Although not a requirement of the present invention, the present invention can be deployed in an Application Service Provider (ASP) environment. Deployment in an ASP environment makes it even easier for users to reap the benefits of the present invention. With the application service provider responsible for the technical aspects of ensuring high availability, scalability and security, the user does not need to implement and maintain these functions on its own. The present invention includes functionality to obtain and store externally obtained data, and if the ASP environment includes connections to external data providers such as credit bureaus, fraud check providers, automated property valuation providers, etc., the benefit to the user is enhanced.

The above examples and discussion focus primarily on the financial services industry; however, it is contemplated that the present invention could be used in any industry comprising multiple lines of business where cross-selling across an enterprise is desired. Although one or more preferred embodiments of the present invention have been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A system for cross-selling products and/or services across an enterprise comprising:
    (a) a plurality of point of contact systems;
    (b) an enterprise-level decision engine;
    (c) a plurality of line-of-business decision engines;
    (d) connection, protocol and message transformation adaptors; and
    (e) a publish-subscribe message framework;
    wherein the point of contact systems generate cross-sell request messages for a given consumer;
    wherein the connection, protocol and message adaptors enable the point of contact systems to communicate with the enterprise-level decision engine and the enterprise-level decision engine to communicate with the line-of-business decision engines by transforming client message format for system compatibility purposes;
    wherein the point of contact systems communicate directly with the enterprise-level decision engine;
    wherein the enterprise-level decision engine obtains data used in generating cross-sell offers from internal and/or external data sources and derives characteristics based on data contained in the cross-sell request message and/or data obtained from the internal and/or external data sources;
    wherein the characteristics derived by the enterprise-level decision engine are shared with one or more line-of-business decision engines via the publish-subscribe message framework and used by the line-of business-level decision engines to generate cross-sell offer decisions;
    wherein the enterprise-level decision engine determines whether a particular line-of-business decision engine will be requested to generate a cross-sell offer decision based on business rules configured by an end user at an enterprise level;
    wherein the cross-sell offer decisions are based on business rules configured at design time by the end user at the enterprise level and, if the enterprise-level decision engine determines that one or more line-of-business decision engines will be requested to generate a cross-sell offer decision, at a line-of-business level, and wherein the enterprise-level business rules and the line-of-business-level business rules are managed by end users independently of one another;
    wherein the publish-subscribe message framework allows data to be published at an enterprise level and subscribed to by the line-of-business decision engines according to business rules established at the line-of-business level, thereby allowing configuration changes at the enterprise-level and line-of-business-level decision engines to occur independently of each other;
    wherein if a line-of-business decision engine is requested to generate a cross-sell offer decision, then the line-of-business decision engine applies its business rules to determine whether a consumer should be offered a particular product, and wherein the line-of-business decision engine returns the cross-sell offer decision for a particular product to the enterprise-level decision engine;
    wherein the enterprise-level decision engine uses core and user-defined tables populated with data to apply offer arbitration rules designed to establish a score associated with a given consumer's likelihood of accepting a given offer, establish a score associated with value to an enterprise of a particular product or service if the given consumer accepts an offer for that product or service and evaluate thresholds regarding quality and maximum number of offers to be presented to the given consumer, thereby ranking multiple offers for the given consumer using an aggregate score to select and deselect certain line-of-business-level offers for presentation to the given consumer via the requesting point of contact system; and
    wherein the enterprise-level decision engine stores data to and retrieves data from both an operational and an analytics data repository, and wherein said data includes information about cross-sell request messages, cross-sell offer decisions, and offers.

2. A method for cross-selling products and/or services across an enterprise comprising:
    (a) providing a plurality of point of contact systems;
    (b) providing an enterprise-level decision engine;
    (c) providing a plurality of line-of-business decision engines;
    (d) providing connection, protocol and message adaptors; and
    (e) providing a publish-subscribe message framework;
    wherein the point of contact systems generate cross-sell request messages;
    wherein the connection, protocol and message adaptors enable the point of contact systems to communicate with the enterprise-level decision engine and the enterprise-level decision engine to communicate with the line-of-business decision engines;

wherein the point of contact systems communicate directly with the enterprise-level decision engine;

wherein the enterprise-level decision engine obtains data used in generating cross-sell offers from internal and/or external data sources and derives characteristics based on data contained in the cross-sell request message and/or data obtained from the internal and/or external data sources;

wherein the characteristics derived by the enterprise-level decision engine are shared with one or more line-of-business decision engines and used by the line-of business-level decision engines to generate cross-sell offer decisions;

wherein the enterprise-level decision engine determines whether a particular line-of-business decision engine will be requested to generate a cross-sell offer decision based on business rules implemented at an enterprise level;

wherein the cross-sell offer decisions are based on business rules implemented at the enterprise level and, if the enterprise-level decision engine determines that one or more line-of-business decision engines will be requested to generate a cross-sell offer decision, at a line-of-business level, and wherein the enterprise-level business rules and the line-of-business-level business rules are managed independently of one another;

wherein the publish-subscribe message framework allows data to be published at an enterprise level and subscribed to by the line-of-business decision engines according to business rules established at the line-of-business level;

wherein if a line-of-business decision engine is requested to generate a cross-sell offer decision, then the line-of-business decision engine applies its business rules to determine whether an offer will be made to a particular consumer or consumers with respect to one or more products or services and generates a cross-sell offer decision, and wherein the line-of-business decision engine returns the cross-sell offer decision to the enterprise-level decision engine; and wherein the enterprise-level decision engine stores data to and retrieves data from both an operational and an analytics data repository, and wherein such data includes information about cross-sell request messages, cross-sell offer decisions, and offers.

3. The method of claim 2, further comprising providing a runtime environment, wherein the cross-sell request message is sent by a point of contact system to the runtime environment, wherein a validation message handling module performs preliminary validation on the cross-sell request message using either Extensible Markup Language schema definitions or custom message validation routines, and wherein an error response is created if invalid data is encountered, and the error response is logged and returned to the point of contact system that generated the cross-sell request message.

4. The method of claim 3, wherein after a cross-sell request message undergoes preliminary validation, a transform message handling module is used to map each source field in the cross-sell request message to a target field in a standard message format, and wherein if the cross-sell request message is in a format other than the standard message format, then the transform message handling module transforms the cross-sell request message into the standard message format.

* * * * *